United States Patent
Zhang et al.

(10) Patent No.: US 8,457,056 B2
(45) Date of Patent: Jun. 4, 2013

(54) NON-SCHEDULED GRANTS IN MULTI-CARRIER ENHANCED UPLINK

(75) Inventors: Danlu Zhang, San Diego, CA (US); Aziz Gholmieh, Del Mar, CA (US); Ravi Agarwal, San Diego, CA (US); Jason F. Hunzinger, Escondido, CA (US); Rohit Kapoor, San Diego, CA (US); Bibhu P. Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 12/702,161

(22) Filed: Feb. 8, 2010

(65) Prior Publication Data

US 2010/0202394 A1    Aug. 12, 2010

Related U.S. Application Data

(60) Provisional application No. 61/150,950, filed on Feb. 9, 2009, provisional application No. 61/160,393, filed on Mar. 16, 2009, provisional application No. 61/218,543, filed on Jun. 19, 2009, provisional application No. 61/234,805, filed on Aug. 18, 2009, provisional application No. 61/236,775, filed on Aug. 25, 2009, provisional application No. 61/247,266, filed on Sep. 30, 2009, provisional application No. 61/248,817, filed on Oct. 5, 2009, provisional application No. 61/257,370, filed on Nov. 2, 2009.

(51) Int. Cl.
*H04W 4/00*    (2009.01)

(52) U.S. Cl.
USPC ............................ 370/329; 370/338; 370/341

(58) Field of Classification Search
None
See application file for complete search history.

(56) References Cited

U.S. PATENT DOCUMENTS

| 8,169,953 B2 | 5/2012 | Damnjanovic et al. |
| 2001/0031014 A1* | 10/2001 | Subramanian et al. ....... 375/260 |

(Continued)

FOREIGN PATENT DOCUMENTS

| EP | 1793509 A1 | 6/2007 |
| EP | 1971095 A1 | 9/2008 |

(Continued)

OTHER PUBLICATIONS

CMCC: "Multicarrier Operation and PDCCH design of Carrier Aggregation" 3GPP Draft; R1-084333, 3rd Generation Partnership Project (3GPP), Mobile Competence Centre; 650, Route Des Lucioles; F-06921 Sophia-Antipolis Cedex; France, no. Prague, Czech Republic; 20081104, Nov. 4, 2008, XP050317608 [retrieved on Nov. 4, 2008] the whole document.

(Continued)

*Primary Examiner* — Chi Pham
*Assistant Examiner* — Soon-Dong D Hyun
(74) *Attorney, Agent, or Firm* — Charles Chesney

(57) ABSTRACT

Systems and methodologies are described that facilitate power distribution and data allocation in a multi-carrier wireless communication system. A portion of transmit power can be pre-allocated to an anchor carrier to support non-scheduled data flows. Remaining power is split among all carriers, including the anchor carrier, after pre-allocation. Data from one or more flows, scheduled and non-scheduled, are allocated to the carriers in accordance with priorities associated with the one or more flows. Allocation of data can be performed sequentially starting with a non-anchor carrier. In addition, non-scheduled data flows can be restricted to the anchor carrier.

47 Claims, 12 Drawing Sheets

U.S. PATENT DOCUMENTS

| | | | |
|---|---|---|---|
| 2003/0128665 A1* | 7/2003 | Bernhard et al. | 370/230 |
| 2005/0031047 A1* | 2/2005 | Maltsev et al. | 375/260 |
| 2005/0043034 A1* | 2/2005 | Abdel-Ghaffar et al. | 455/453 |
| 2005/0099937 A1 | 5/2005 | Oh et al. | |
| 2006/0203724 A1 | 9/2006 | Ghosh et al. | |
| 2007/0070908 A1* | 3/2007 | Ghosh et al. | 370/236 |
| 2007/0232318 A1 | 10/2007 | Nobukiyo | |
| 2008/0037413 A1 | 2/2008 | Gu et al. | |
| 2008/0130672 A1 | 6/2008 | Yue et al. | |
| 2008/0151819 A1 | 6/2008 | Bachl et al. | |
| 2008/0214229 A1 | 9/2008 | Lim et al. | |
| 2010/0111023 A1 | 5/2010 | Pelletier et al. | |
| 2010/0157895 A1 | 6/2010 | Pani et al. | |
| 2010/0202392 A1 | 8/2010 | Zhang et al. | |
| 2010/0272078 A1 | 10/2010 | Pani et al. | |
| 2011/0044222 A1* | 2/2011 | Gerstenberger et al. | 370/311 |
| 2011/0081940 A1* | 4/2011 | Gerstenberger et al. | 455/522 |
| 2011/0090806 A1 | 4/2011 | Ozturk et al. | |
| 2012/0002630 A1 | 1/2012 | Bergman et al. | |
| 2012/0008563 A1 | 1/2012 | Johansson et al. | |

FOREIGN PATENT DOCUMENTS

| | | |
|---|---|---|
| EP | 2129139 A1 | 12/2009 |
| JP | 2006237897 A | 9/2006 |
| JP | 2008537448 A | 9/2008 |
| JP | 2008539668 A | 11/2008 |
| WO | 2006113712 A1 | 10/2006 |
| WO | WO2006118831 | 11/2006 |
| WO | 2008105316 A1 | 9/2008 |

OTHER PUBLICATIONS

Huawei: "PDCCH on Carrier Aggregation" 3GPP Draft; R1-083705 PDCCH on Carrier Aggregation, 3rd Generation Partnership Project (3GPP), Mobile Competence Centre; 650, Route Des Lucioles ; F-06921 Sophia-Antipolis Cedex; France, no. Prague, Czech Republic; 20080924, Sep. 24, 2008, XP050317047 [retrieved on Sep. 24, 2008] Section 3, "Anchor carrier".

International Search Report and Written Opinion—PCT/US2010/023651, International Search Authority—European Patent Office—May 6, 2010.

International Search Report and Written Opinion—PCT/US2010/023660, International Search Authority—European Patent Office—May 21, 2010.

Nokia Siemens Networks et al: "Primary Component Carrier Selection, Monitoring, and Recovery" 3GPP Draft; R1-090735_Primaryccselect, 3rd Generation Partnership Project (3GPP), Mobile Competence Centre; 650, Route Des Lucioles; F-06921 Sophia-Antipolis Cedex; France, no. Athens, Greece; 20090203, Feb. 3, 2009, XP050318599.

Zhang D et al: "HSUPA Scheduling Algorithms Utilizing RoT Measurements and Interference Cancellations" Communications, 2008. ICC 08. IEEE International Conference on, IEEE, Piscataway, NJ, USA, May 19, 2008, pp. 5033-5037, XP031266265 ISBN: 978-1-4244-2075-9 abstract p. 5034, right-hand column, paragraph 2nd but last.

Alcatel-Lucent "A comparison between Sequential and Parallel Power Allocation in E-TFC Selection For DC-HSUPA", 3GPP TSG-RAN WG2 meeting #67, R2-094237, Shenzhen, China, Aug. 24-28, 2009, pp. 1-12.

Ericsson: "E-TFC selection for DC-HSUPA", 3GPP Draft: R2-092942, E-TFC_Selection_For_DC-HSUPA, 3rd, Generation Partnership Project (3GPP), Mobile Competence Centre, 650, Route des Lucioles; F-06921 Sophia-Antipolis Cedex; France, no. San Francisco, USA; Apr. 28, 2009, XP050340739 [retrieved on Apr. 28, 2009] section 2.1.2 section 2.2.1.

ETSI MCC "Report of 3GPP TSG RAN WG2 meeting #67", R2-095433, Shenzhen, China, Aug. 24-28, 2009.

* cited by examiner

NON-SCHEDULED GRANTS IN MULTI-CARRIER ENHANCED UPLINK

CLAIM OF PRIORITY UNDER 35 U.S.C. §119

The present Application for Patent claims priority to U.S. Provisional Application Ser. No. 61/150,950, filed Feb. 9, 2009, entitled "DATA RATE SELECTION BASED ON SCHEDULING GRANT," U.S. Provisional Application Ser. No. 61/160,393, filed Mar. 16, 2009, entitled "DATA RATE SELECTION BASED ON SCHEDULING GRANT," U.S. Provisional Application Ser. No. 61/218,543, filed Jun. 19, 2009, entitled "DATA RATE SELECTION BASED ON SCHEDULING GRANT," U.S. Provisional Application Ser. No. 61/234,805, filed Aug. 18, 2009, entitled "DATA RATE SELECTION BASED ON SCHEDULING GRANT," U.S. Provisional Application Ser. No. 61/236,775, filed Aug. 25, 2009, entitled "DATA RATE SELECTION BASED ON SCHEDULING GRANT," U.S. Provisional Application Ser. No. 61/247,266, filed Sep. 30, 2009, entitled "DATA RATE SELECTION BASED ON SCHEDULING GRANT," U.S. Provisional Application Ser. No. 61/248,817, filed Oct. 5, 2009, entitled "DATA RATE SELECTION BASED ON SCHEDULING GRANT," and U.S. Provisional Application Ser. No. 61/257,370, filed Nov. 2, 2009, entitled "ESTIMATING A NORMALIZED POWER REMAINING MARGIN." The aforementioned U.S. Provisional Applications are assigned to the assignee hereof and hereby expressly incorporated by reference in their entirety.

BACKGROUND

I. Field

The following description relates generally to wireless communications, and more particularly to handling non-scheduled flows in a multi-carrier configuration wherein power for uplink transmissions is distributed among a plurality of carriers.

II. Background

Wireless communication systems are widely deployed to provide various types of communication content such as voice and data. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, High Speed Packet Access (HSPA), High Speed Downlink Packet Access (HSDPA), High Speed Uplink Packet Access (HSUPA), 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As wireless communications continue to grow in popularity, consumers demand additional features and greater performance. Such features can require high data rates, which can be difficult to achieve with a limited bandwidth or spectrum. One option to increase bandwidth (e.g., widen bandwidth), without a large impact on the complexity of radio equipment (e.g., transmitters and receivers), is to implement carrier aggregation. With carrier aggregation, multiple component carriers can be aggregated or grouped to result in an overall wider system bandwidth. Each component carrier can include a complete downlink and uplink with control and traffic channels. Thus, each component carrier can appear as an individual deployment of a wireless communication technology.

Wireless communication devices (e.g., base stations, mobile terminals, etc.) can be configured to utilize multiple component carriers to transmit data. For instance, a base station and mobile terminal can be configured to respectively transmit and receive data on downlinks of multiple carriers. In addition, the mobile terminal can be configured to utilize a plurality of uplink frequencies on multiple uplink carriers. Accordingly, higher data rates and greater overall throughput can be achieved without a large impact on equipment complexity.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method is provided that includes pre-allocating a portion of transmit power to a first carrier in a plurality of carriers, wherein the first carrier is an anchor carrier. The method also includes distributing remaining transmit power, after pre-allocation of the portion, between at least the first carrier and a second carrier of the plurality of carriers. In addition, the method can include sequentially allocating data from one or more data flows to at least the first carrier and the second carrier, wherein allocation starts with the second carrier, wherein the second carrier is a non-anchor carrier.

Another aspect relates to a wireless communications apparatus. The wireless communications apparatus can include at least one processor configured to reserve a portion of transmit power to an anchor carrier in a multi-carrier uplink configuration, wherein the portion of transmit power is based upon data requirements of at least one non-scheduled data flow. The at least one processor is further configured to split remaining transmit power, after power reservation to the anchor carrier, among a plurality of carriers including the anchor carrier. In addition, the at least one processor is further configured fill a plurality of protocol data units respectively associated with the plurality of carriers with data from a plurality of data flows in accordance with priorities associated with the plurality of data flows.

Yet another aspect relates to an apparatus. The apparatus includes means for reserving a portion of transmit power to a first carrier in a plurality of carriers, wherein the first carrier is an anchor carrier. The apparatus can also include means for distributing remaining transmit power, after pre-allocation of the portion, between at least the first carrier and a second carrier of the plurality of carriers. Further, the apparatus includes means for sequentially allocating data from one or more data flows to at least the first carrier and the second carrier, wherein allocation starts with the second carrier.

Still another aspect relates to a computer program product, which can have a computer-readable medium code for causing at least one computer to reserve a portion of transmit power to an anchor carrier in a dual-carrier uplink configuration, wherein the portion of transmit power is based upon data requirements of at least one non-scheduled data flow. The computer-readable medium can also comprise code for causing the at least one computer to split remaining transmit power, after power reservation to the anchor carrier, between the anchor carrier and a secondary carrier. In addition, the computer-readable medium can include code for causing the at least one computer to fill a first protocol data unit and a second protocol data unit respectively associated with the anchor carrier and the secondary carrier, wherein the first protocol data unit and the second protocol data unit are sequentially filled starting with the second protocol data unit.

Moreover, an additional aspect relates to an apparatus that includes a pre-allocation module that reserves a portion of transmit power for a non-scheduled data flow on an anchor carrier of a multi-carrier system. The apparatus can also include a power split module that distributes remaining transmit power, after reservation of the portion by the pre-allocation module, among the anchor carrier and a secondary carrier. In addition, the apparatus can include a data allocation module that distributes data from one or more data flows to the anchor carrier and the secondary carrier, wherein data allocation module sequentially distributes data to the anchor carrier and the secondary carrier starting with the secondary carrier.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
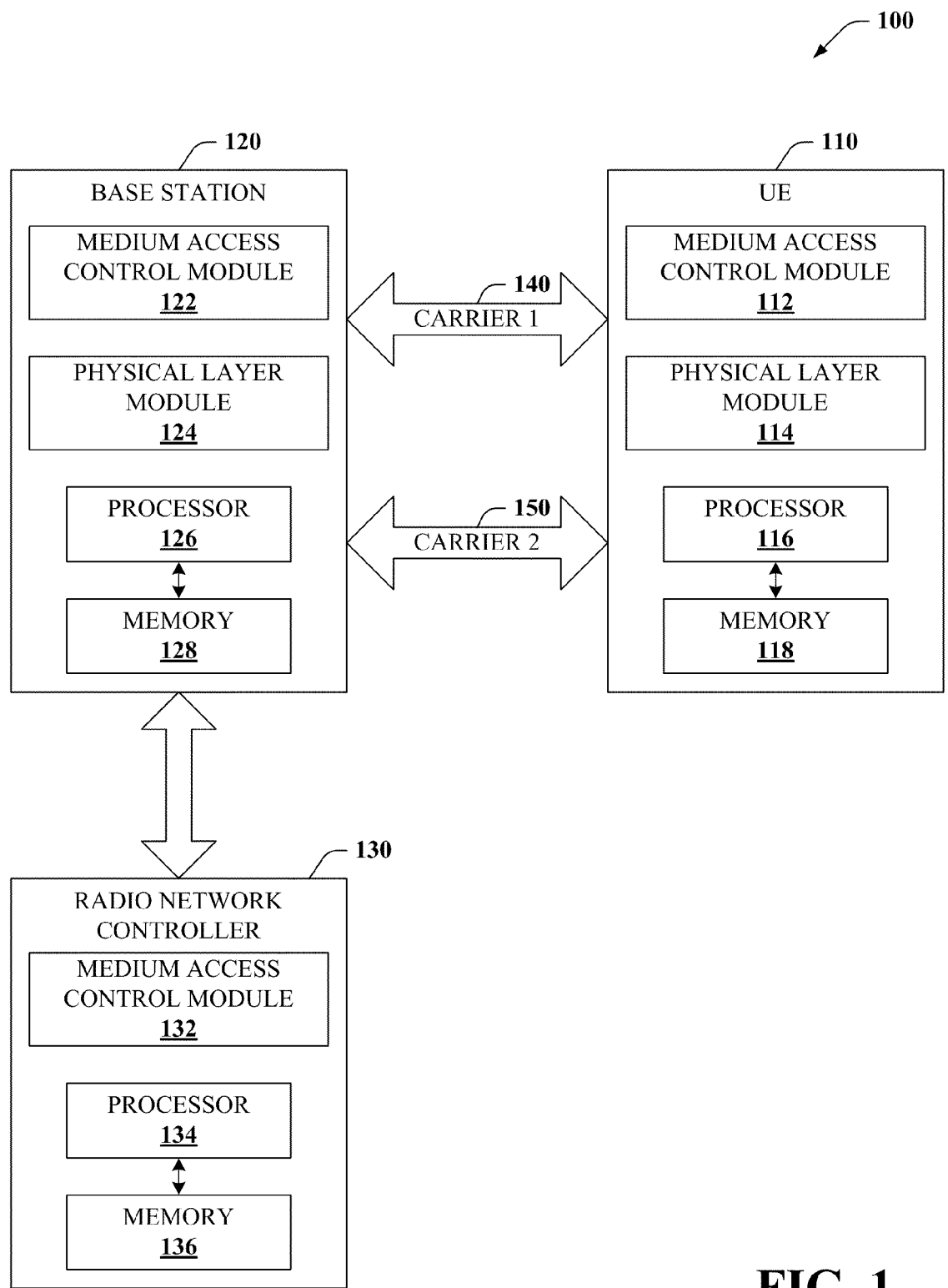
FIG. 1 illustrates an example wireless communication system that employs multiple component carriers to facilitate higher uplink data rates in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, High Speed Packet Access (HSPA), High Speed Downlink Packet Access (HSDPA), High Speed Uplink Packet Access (HSUPA), etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. HSPA, HSDPA, HSUPA, UTRA, E-UTRA, UMTS, LTE, LTE-A, SAE, EPC, and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques. For clarity, terminology associated with WCDMA, HSPA, HSDPA, and HSUPA are employed in description below. However, it is to be appreciated that the claims appended hereto are not intended to be limited to WCDMA, HSPA, HSDPA, and HSUPA, unless explicitly done so.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules etc. discussed in connection with the figures. A combination of these approaches can also be used.

Referring now to drawings, FIG. 1 illustrates an example wireless communication system 100 that employs multiple component carriers to facilitate higher uplink data rates in accordance with various aspects. Wireless communication system 100 includes user equipment (UE) 110 and base station 120 that communicate with one another over a wireless link. In one example, base station 120 can be an access point, such as a macrocell access point, femtocell or picocell access point, a NodeB, an eNodeB (eNB), a mobile base station, a portion thereof, and/or substantially any device or apparatus that provides access to a wireless communication network. While only UE 110 and base station 120 are illustrated in FIG. 1, it should be appreciated that system 100 can include any number of UEs and/or base stations. In accordance with an aspect, base station 120 can transmit information to UE 110 over a forward link or downlink channel and UE 110 can transmit information to base station 120 over a reverse link or uplink channel. It should be appreciated that system 100 can operate in an WCDMA wireless network, an OFDMA wireless network, a CDMA network, a 3GPP LTE or LTE-A wireless network, a 3GPP2 CDMA2000 network, an EV-DO network, a WiMAX network, a HSPA network, etc.

System 100 can further include radio network controller (RNC) 130 which can control one or more base stations, such as base station 120. RNC 130 can handle call setup, quality-of-service (QoS), radio resource management, automatic repeat request (ARQ) protocol, and the like. In addition, RNC 130 is connected to the Internet and the public switched telephone network via a core network (not shown).

In accordance with an aspect, UE 110 and base station 120 can be configured to employ multiple component carriers. For example, UE 110 and base station 120 can communicate via carrier 140 and carrier 150. While only two carriers are depicted in FIG. 1, it is to be appreciated that UE 110 and base station 120 can be configured to operate with more than two carriers.

Each of carriers 140 and 150 can encapsulate a complete radio interface. For instance, carriers 140 and 150 can respectively include a WCDMA/HSPA radio interface, such that each carrier 140 and 150 include a plurality of downlink and uplink logical, transport, and physical channels, such as, but not limited to, a dedicated channel (DCH), an enhanced dedicated channel (E-DCH), a high-speed downlink shared channel (HS-DSCH), a high-speed shared control channel (HS- SCCH), a broadcast channel (BCH), a downlink shared channel (DSCH), and the like. Thus, UE 110 can receive complete wireless communication services via carrier 140 or carrier 150. In addition, greater data rates can be achieved through utilization of both carriers 140 and 150 in parallel.

In an aspect, UE 110 can be configured (e.g., by base station 120 and/or RNC 130) to utilize both carriers 140 and 150 in connection with high-speed uplink packet access (HSUPA). HSUPA provides enhanced uplink channels that UE 110 can employ to increase uplink capacity, uplink data throughput, and uplink performance (e.g., reduce delay). In accordance with an example, HSUPA or Enhanced Uplink provides a set of features to increase uplink capabilities. For instance, HSUPA provides scheduling at the NodeB or base station, hybrid ARQ, higher order modulation, transmission time interval (TTI) options, etc.

In an aspect, UE 110 can include a medium access control (MAC) module 112, which implements MAC layer features. The MAC module 112 can provide services to upper layers (e.g., radio link control (RLC), etc.) via logical channels such as, but not limited to, a dedicated control channel (DCCH) and a dedicated traffic channel (DTCH). In one example, the MAC module 112 can perform packet format selection, and multiplexing of one or more flows (e.g., data flows on the logical channels) into a selected packet format. UE 110 can also include a physical layer module 114 which implements physical layer aspects of uplink transmissions. For instance, the physical layer module 114 can perform coding of transport blocks, transport channel multiplexing, modulation of a radio frequency carrier, insertion of a cyclic redundancy check (CRC), spreading bits to a chip rate, and the like. In an example, the MAC module 112 can select a packet format and multiplex one or more data flows into the selected packet format in accordance with priorities associated with respective data flows to generate a transport block. The physical layer module 114 can attach a CRC to the transport block. After CRC attachment, the physical layer module 114 can encode the transport block. For instance, the physical layer module 114 can employ turbo coding or convolutional coding. The coded transport block can be interleaved and rate matching can be performed. Multiple coded and interleaved transport blocks can be multiplexed and modulated to generate a stream of modulation symbols. The modulation symbols can be mapped to a physical channel, such as an enhanced dedicated physical data channel (E-DPDCH). After mapping to a physical channel, the stream can be converted (e.g., via digital-to-analog conversion) and modulated onto a radio-frequency carrier wave.

Base station 120 can include a physical layer module 124 and a MAC module 122. The physical layer module 124 implements reception of the radio-frequency carrier wave, conversion (e.g., via analog-to-digital conversion), demodulation, demultiplexing, decoding, and the like, to recover the transport block transmitted by UE 110. The MAC module 122 can implement hybrid ARQ handling on the transport block provided by the physical layer module 124. In addition, the MAC module 122 can demultiplex the transport block into one or more data flows. The data flows can be forwarded to upper layers (e.g., RLC) either in base station 120 or RNC 130. The RNC 130 can include a MAC module 132, which can perform similar MAC functionality as MAC module 122 of base station 120. In one aspect, MAC functionality is implemented by the MAC module 132 for non-enhanced uplink transmissions. For enhanced uplink transmissions, the MAC module 132 can implement reordering to facilitate in-sequence delivery of data blocks.

According to an aspect, enhanced uplink or HSUPA transmissions of UE 110 are scheduled by a scheduler (not shown) of base station 120. The scheduler can determine when and at what data rate UE 110 can transmit on the uplink. In a single carrier configuration, for example, UE 110 can generate an uplink resource request or scheduling request. The scheduling request can inform the scheduler how high a data rate UE 110 would like to utilize. The maximum data rate supportable by UE 110 can be expressed as a power ratio between E-DPDCH transmit power and DPCCH transmit power. In an aspect, the scheduling request can be determined by the MAC module 112 of UE 110.

The scheduler of base station 120 can determine a scheduling grant for UE 110 based upon the scheduling grant, channel conditions, and/or other information. The scheduling grant indicates a maximum power ratio (e.g., E-DPDCH-to-DPCCH power ratio or transmit-to-pilot ratio (T2P)) that UE 110 can employ for transmissions. The scheduling grant can be signaled to UE 110 as an absolute scheduling grant via an E-DCH Absolute Grant Channel (E-AGCH) or a relative scheduling grant via an E-DCH Relative Grant Channel (E-RGCH). Absolute scheduling grants typically convey absolute changes and can be employed to assign a high data rate for an upcoming packet transmission. Relative grants convey relative changes during ongoing packet transmissions.

UE 110 maintains a serving grant variable which tracks the maximum T2P available to UE 110 for high speed packet transmissions on E-DCH. UE 110 updates the serving grant variable when an absolute grant or a relative grant is received. The MAC module 112 can determine a data rate to employ for an uplink transmission within the constraints of the serving grant variable and total available power. In one example, the MAC module 112 determines the data rate through E-DCH Transport Format Combination (E-TFC) selection (e.g., transmit packet format selection). Each E-TFC available to UE 110 is associated with a power requirement (e.g., a required T2P ratio to apply a given E-TFC). The UE 110 can evaluate each E-TFC requirement relative to the total available power to identify which E-TFCs can be supported (e.g., the total available power is sufficient to meet the E-TFC requirement) and which E-TFCs are blocked (e.g., the total available power is insufficient to meet the E-TFC requirement). The UE 110 can select an E-TFC from a set of supported E-TFCs which maximizes an amount of data that can be transmitted without exceeding the serving grant.

According to an aspect, UE 110 can be configured to utilize two or more carriers, such as carriers 140 and 150, for uplink transmissions. In one example, the scheduler of base station 120 can operate jointly across carriers. According to this example, UE 110 can transmit a joint or total scheduling request to base station 120. The scheduler can send a total grant across carriers or send a grant respective to each carrier. In another example, the scheduler can operate independently on each carrier and/or separate schedulers can be implemented in base station 120 for each carrier. Pursuant to the example of independent schedulers, UE 110 can transmit separate scheduling requests per carrier. To determine the separate requests, UE 110 can estimate a total available power for enhanced uplink transmissions across all carriers and split or allocate a portion of the total available power to each carrier.

UE 110 can maintain independent serving grant variables for each carrier UE 110 is configured to employ. In addition, for each carrier configured, UE 110 selects an E-TFC to utilize for an uplink transmission on the carrier. In an aspect, UE 110 and, specifically, MAC module 112 selects E-TFCs on each carrier in a joint manner subject to a common total available power. As hybrid ARQ is configured on each carrier, UE 110 may not be transmitting new packets on each carrier at a given transmission time interval (TTI). In one example, a retransmission can be required on one or more carriers. In the case of two carriers (e.g., carriers 140 and 150), three situations are possible for a given TTI: two retransmissions, one retransmission and one new transmission, and two new transmissions. In the case of two retransmissions, E-TFC selection need not be done as previous packet formats and power allocations can be utilized again for the retransmissions. In the case of one retransmission and one new transmission, E-TFC selection as described supra with respect to a single carrier can be performed for the new transmissions. In this example, the total available power for the new transmission is the total available power for enhanced uplink transmissions minus the power required for the retransmission. For two new transmissions, UE 110 determines how much power from the total available power for enhanced uplink transmissions is to be allocated to each carrier. The power allocated to each carrier in turn influences the E-TFC selected for each carrier.

In one aspect, UE 110 can implement a water-filling or complete optimization power split scheme. According to this optimization, constraints include a maximum allowed UE transmit power and serving grants for both carriers. In one example, a brute-force search can be conducted to identify an optimal power distribution solution. In another example, an approximation can be determined.

According to an aspect, $T2P_m$ is the T2P of an E-TFC selected on carrier m. An optimal E-TFC selection can be a result of the following optimization, which is to find $T2P_m$ for each carrier m such that $\Sigma_m R(T2P_m)$ is maximized subject to the following constraints:

$T2P_m \geq 0$ $T2P \leq SG_m$ $\Sigma_m (P_{DPCCH,target,m} + P_{DPCCH,target,m} * T2P_m + P_{DPDCH,m} + P_{HS-DPCCH,m} + P_{E-DPCCH,m}) \leq P_{max}$ Pursuant to this example, $R(T2P_m)$ is a date rate associated with $T2P_m$, which can be computed based upon a configured interpolation or extrapolation after a hybrid ARQ target is considered. $SG_m$ is a serving grant on carrier m. $P_{max}$ represents a maximum allowed transmit power of UE 110. $P_{DPCCH,target,m}$ is based upon a 3-slot filtered DPCCH power and compressed mode status. $P_{DPDCH,m}$ represents an estimated DPDCH transmit power. In an example, $P_{DPDCH,m}$ can be estimated based upon $P_{DPCCH,target,m}$ and gain factors from TFC selection already made (e.g., prior to E-TFC selection). $P_{HS-DPCCH,m}$ is an estimated HS-DPCCH transmit power based upon a maximum HS-DPCCH gain factor, $P_{DPCCH,target,m}$, most recent signaled values of ACK, NACK, and CQI. $P_{E-DPCCH,m}$ is an estimated E-DPCCH transmit power including E-DPCCH boosting.

Denoting a first and second derivative of R(T2P), with respect to T2P, as R'(T2P) and R"(T2P), respectively. R'(T2P) and R"(T2P) can be found from the slope of R(T2P) via interpolation/extrapolation. In an example, R(T2P) can be concave such that $R'(T2P) > 0$ and $R"(T2P) \leq 0$. The concavity implies that optimal T2P can be identified for each carrier according to the following. Carriers are sorted such that $P_{DPCCH,target,1} \leq P_{DPCCH,target,2}$, for a two carrier example. Next, $T2P_1$ is determined to be as high as possible, wherein $T2P_1$ is limited by either $SG_1$ or $P_{max}$. A first value represented by $R'(T2P_1)/P_{DPCCH,target1}$ is evaluated to determine if the first value is greater than or equal to a second value denoted by $R'(0)/P_{DPCCH,target,2}$. If the first value is greater than or equal to the second value, the optimization is complete. Otherwise, the optimization can continue. If the optimization continues, $T2P_1$ and $T2P_2$ are identified such that $R'(T2P_1)/P_{DPCCH,target,1}$ equals $R'(T2P_2)/P_{DPCCH,target,2}$. In accordance with an aspect, the equality can be established through a search wherein $T2P_1$ is allocated to the point where $R'(T2P_1)/P_{DPCCH,target,1} \leq R'(0)/P_{DPCCH,target,2}$. $T2P_1$ and $T2P_2$ can be alternately increased until the equality is achieved. Although the optimization example described above is illustrated in terms of two carriers, it is to be appreciated that the optimization can be extended to more than two carriers and the claims appended hereto are intended to cover situations wherein the number of carriers exceeds two.

While UE 110 retains sufficient information to conduct the optimal search detailed above, an approximation of the optimum can be employed to reduce complexity in accordance with another aspect. In an aspect, the complexity of the optimal solution is due to the concavity of R(T2P). The concavity can be significant when received signal-to-interference-and-noise ratio (SINR) is high. In the uplink of CDMA systems, the received SINR is typically low to medium due to intra-cell and inter-cell interference. Accordingly, R(T2P) can be assumed to be linear. As a consequence, $R'(T2P_1)/P_{DPCCH,target,1} \geq (T2P_2)/P_{DPCCH,target,2}$ can be true for most combinations of $T2P_1$ and $T2P_2$. In view of this, a greedy-filling procedure can be employed as a close approximation to the optimal solution. In accordance with an aspect, the carriers can be sorted such that $P_{DPCCH,target,1} \leq P_{DPCCH,target,2}$. $T2P_1$ can be made as large as possible given that $T2P_1$ is limited by $SG_1$ and $P_{max}$. A remaining power is determined after $T2P_1$ is identified for carrier 1. $T2P_2$ is identified such that it is the maximum allowed in view of the remaining power and $SG_2$. In one example, this greedy filling scheme can optimize an instantaneous data rate of UE 110.

According to another aspect, a parallel split scheme can be employed as opposed to a sequential approach (e.g., greedy-filling, water-filling, etc.). In a parallel approach, UE 110 determines the power on each carrier at the same time. In an example with two carriers (e.g., carrier 140 (labeled carrier 1 in the example) and carrier 150 (labeled carrier 2 in the example)), UE 110 finds a maximum T2P on each carrier, denoted as $T2P_{max,1}$ and $T2P_{max,2}$, such that the following condition holds:

$TxPilotPwr_1(1 + C2P_1 + T2P_{max,1}) + TxPilotPwr_2(1 + C2P_2 + T2P_{max,2}) = P_{max}$ and $T2P_{max,1}/SG_1 = T2P_{max,2}/SG_2$ Pursuant to this example, $TxPilotPwr_i$ is a transmit pilot power on carrier i, $C2P_i$ is a total power offset of control channels (e.g., HS-DPCCH) on carrier i, $P_{max}$ is a maximum power, and $SG_i$ is a serving grant on carrier i. In one aspect, $P_{max}$ reflects considerations of a maximum power reduction (MPR) or a cubic metric (CM) backoff. According to the parallel approach, a proportion, α, can be defined as follows:

$\alpha = T2P_{max,1}/SG_1 = T2P_{max,2}/SG_2$ which can be restated as:

$$\alpha = \frac{P_{max} - TxPilotPwr_1(1 + C2P_1) - TxPilotPwr_2(1 + C2P_2)}{TxPilotPwr_1 * SG_1 + TxPilotPwr_2 * SG_2}$$

After the proportion, α, is determined, power can be allocated to each carrier based upon respective serving grants, such that the proportion between the power allocated and the serving grant equals α.

In accordance with another aspect, UE 110 can implement an equal split power distribution scheme. For instance, UE 110 can split total available power equally across all carriers. For example, UE 110 can apportion equal shares of the total available power for E-DCH transmission to carrier 140 and carrier 150. In the power distribution schemes described above (e.g., water filling scheme, greedy filling scheme, parallel approach, equal split scheme), a total available power is distributed across carriers. According to another aspect, the total available power is derived from the maximum power available to UE 110 for transmission. If DPDCH is configured on one or more carriers, TFC selection occurs for DPDCH transmissions assuming all power from the maximum power available, after any pilot and overhead power on all carriers is deducted, can be used for the DPDCH transmissions. Next, power required for E-DPCCH or HS-DPCCH transmission on all carriers is determined and deducted from the total power. Accordingly, the total available power utilized in the above described distribution schemes (e.g., the power available for E-DCH transmissions) can be all leftover power from the maximum power available to UE 110 after allocation to DPDCH, DPCCH, and HS-DPCCH.

In another example, in a single-carrier configuration, a state of each E-TFC (e.g., supported or blocked) for each data flow or MAC-d flow is updated every TTI regardless of whether there is a new transmission. The E-TFCs states can also be employed to evaluate a Happy Bit (e.g., a portion of scheduling information that indicates whether a UE is happy or unhappy with a current serving grant). In a multi-carrier configuration, the state update is based on the power split. Thus, in one aspect, a power split procedure can be performed every TTI. In a dual carrier case with two retransmissions for a given TTI, the power split should follow the parallel approach and be based upon the serving grants of the two carriers. In situations with one retransmission and one new transmission, the parallel approach can be applied. If the UE is not power limited after applying the parallel approach, special attention is not required. If the UE is power limited, the power split can be based upon an actual power utilized by the retransmission. It is to be appreciated that the power split need not consider UE power limitation. For instance, the power split can occur without verifying the UE power limitation condition. In situations with two new transmissions, the power split can be implemented according to the parallel approach and based upon the serving grants of the two carriers.

In accordance with another aspect, non-scheduled flows can disrupt power splitting and/or lead to logical channel priority violations in multi-carrier configurations. In one example, a non-scheduled flow is a low data rate flow, which is delay sensitive. For instance, voice data can comprise a non-scheduled flow. If all data required scheduling, then a mobile device would request for any data transmission, and a base station would schedule the mobile device. For voice data, the scheduling procedure introduces delay which can disrupt a conversation. To avoid such delay, such flows can be non-scheduled and transmitted at any time.

For single-carrier configuration, after power consumed by pilot, overhead, and DPDCH is identified and a remaining power determined, the state of each E-TFC, in terms of supported versus blocked, can be updated based on a power required for each E-TFC. With regard to non-scheduled flows, some rules can be implemented to regulate E-TFC selection. One rule, for example, can specify that, when a transmission in a TTI includes scheduled data, a size of a selected MAC-e or MAC-i PDU does cannot exceed a total of all non-scheduled grants application for transmission in the TTI, a maximum number of scheduled bits based on a serving grant and a power offset from a selected HARQ profile, and a size of triggered scheduling information. Another rule, for instance, can be that only E-TFCs in a supported state are considered. Yet another rule can be that a UE considers E-TFCs included in a minimum set of E-TFCs to be in a supported state. From such rules, a variety of scenarios can be implied. In one example scenario, non-scheduled flows can always be transmitted up to a non-scheduled grant, regardless of logical channel priority, when a UE has sufficient power to satisfy both scheduled and non-scheduled grants. In another scenario, the UE does not have sufficient power to fill both the scheduled and non-scheduled grants. Accordingly, the non-scheduled flow can be transmitted when associated with a high enough priority to be included in data allocation.

In accordance with an aspect, for multi-carrier configurations, non-scheduled flows can be restricted to an anchor carrier. In an aspect, the anchor carrier is a carrier with a complete set of control channels, including all the control channels for the downlink. For example, in a multi-carrier uplink configuration, each uplink carrier need not include downlink control channels. In case of dual carrier HSUPA (DC-HSUPA), the anchor carrier can be a carrier that includes HS-DPCCH. The power distribution schemes described supra ignore non-scheduled grants. To reduce impact on non-scheduled flows in multi-carrier configurations, power for the non-scheduled flows can be pre-allocated to the anchor carrier prior to executing a power split mechanism. It is to be appreciated that the power split mechanism can be a parallel power split mechanism (e.g., proportional distribution) or a sequential power split mechanism (e.g., greedy-filling, water-filling, etc.). In another aspect, data allocation (e.g., filling transport blocks for each carrier with data from flows) can follow priorities of logical channels. In one example, data allocation can begin on a secondary or non-anchor carrier. Commencing data allocation on a non-anchor carrier enables queues of high priority scheduled flows to be emptied as much as possible prior to mixing scheduled and non-scheduled flows on the anchor carrier.

As further illustrated in system 100, UE 110 can include a processor 116 and/or a memory 118, which can be utilized to implement some or all of the functionality of MAC module 112 and physical layer module 114. Similarly, FIG. 1 illustrates that base station 120 can also include a processor 126 and/or a memory 128, which can be employed to implement some or all of the functionality of MAC module 122 and physical layer module 124 and RNC 130 can include a processor 134 and/or a memory 136 to implement MAC module 132.

Figure 2:
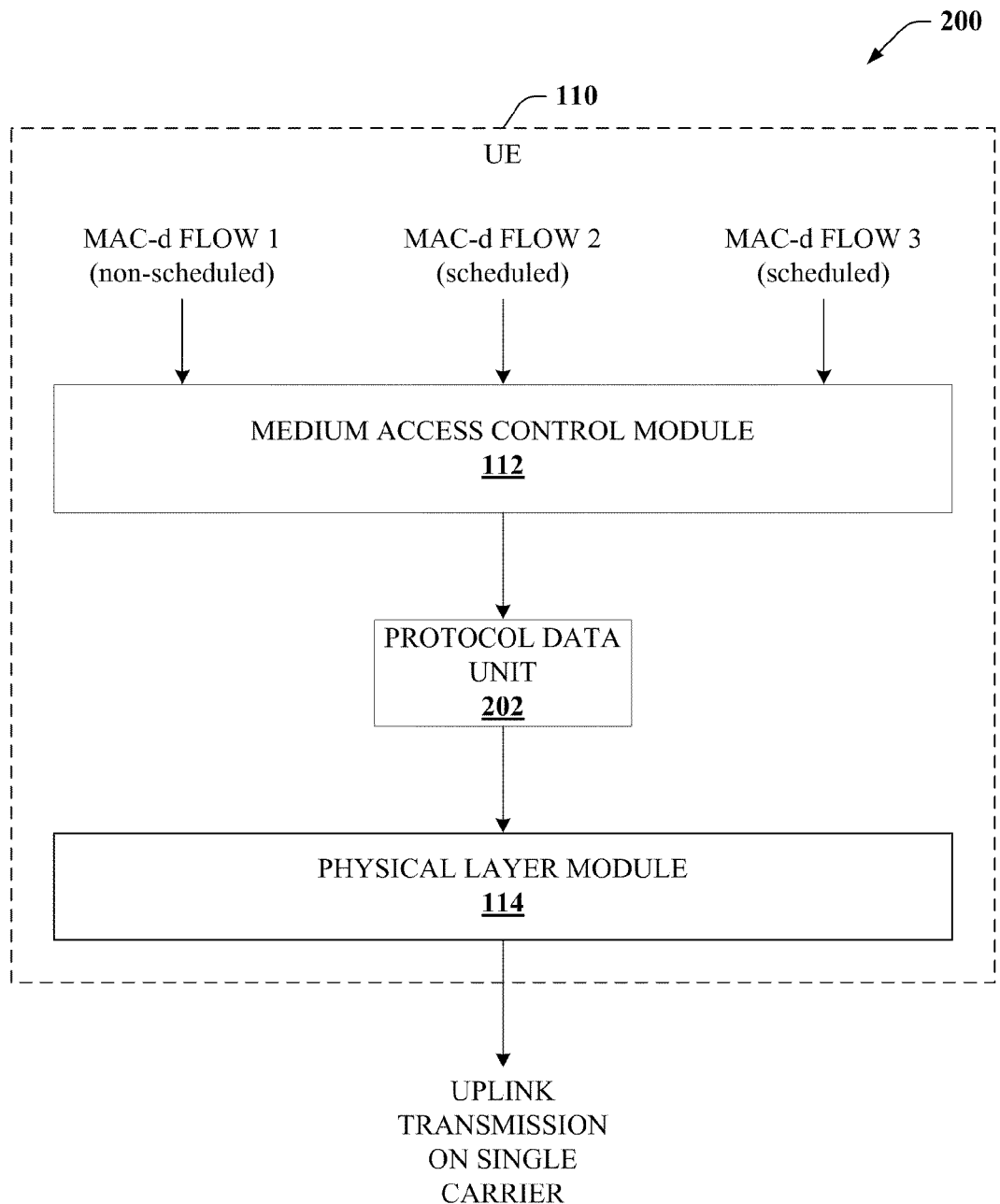
FIG. 2 is an illustration of an example system that facilitates multiplexing of one or more data flows to be transmitted on a single carrier enhanced uplink in accordance with various aspects.

Turning to FIG. 2, a system 200 is depicted that facilitates multiplexing of one or more data flows to be transmitted on a single carrier enhanced uplink in accordance with various aspects. System 200 can include a UE 110 configured to utilize a single carrier. In an aspect, UE 112 can include a MAC module 112 that can multiplex one or more MAC-d flows (e.g., data flows) into a protocol data unit (PDU) 202 in accordance with a packet format. Identifying the packet format can be effectuated by the MAC module 112 via E-TFC selection as described supra. UE 110 can further include a physical layer module 114 configured to transmit the PDU 202, via a transmitter and one or more antennas, to a base station on an enhanced uplink channel.

In an aspect, the MAC module 112 can execute an E-TFC selection procedure, which can include E-TFC restriction. In E-TFC restriction, for each MAC-d flow, a state (e.g., supported or blocked) associated with each E-TFC is updated based on a remaining power (e.g., a normalized remaining power margin). In one example, E-TFCs included in a minimum set are considered support for non-scheduled MAC-d flows. After E-TFC restriction, the MAC module 112 can implement a data allocation procedure to identify an E-TFC to employ for PDU 202.

In an example, data allocation obeys priority levels among logical channels (e.g., priorities of respective MAC-d flows). The MAC module 112 can start the data allocation procedure at a first MAC-d flow, with data, that is assigned a highest priority. The MAC module 112 evaluates other MAC-d flows to determine whether the other flows can be multiplexed with the highest priority MAC-d flow. In one aspect, only MAC-d flows, with data to transmit, which can be multiplexed with the highest priority MAC-d flow are considered in a current TTI.

The MAC module 112 can allocate data to PDU 202, sequentially, starting with the highest priority MAC-d flow. When a current MAC-d flow, for which the MAC module 112 is allocating data, is a scheduled flow, the MAC module 112 allocates data from the current flow until one of a maximum E-TFC that is supported and permissible by a serving grant is filled or no more data is queued in the current flow. When the current MAC-d flow is a non-scheduled flow, the MAC module 112 allocates data from the current flow up to one of a non-scheduled grant configured for the flow, a maximum E-TFC supported, or the current flow is exhausted of data.

In examples of single carrier E-TFC selection, UE 110 can include three MAC-d flows. MAC-d Flow 1 can be a non-scheduled flow while MAC-d Flows 2 and 3 can be configured as scheduled flows. Pursuant to the examples, Flows 1, 2, and 3 can be multiplex together by the MAC module 112 into PDU 202.

In a first example, the MAC-d flows can be ranked according to priority such that Flow 1 has a highest priority and Flow 3 has a lowest priority. The MAC module 112 fills PDU 202 with data from MAC-d Flow 1 until no more data is queued on Flow 1 or a data from Flow 1 has been allocated up to one of a non-scheduled grant value or a maximum supported E-TFC size. After allocation of data from Flow 1, the MAC module 112 can fill PDU 202 with data from Flow 2, if a capacity of PDU 202 is not reached. The MAC module 112 can allocate data from Flow 2 to PDU 202 until a maximum E-TFC size is reached or data on Flow 2 is exhausted. The MAC module 112 can continue data allocation with data on Flow 3 if room remains in PDU 202.

In a second example, the MAC-d flows can be ranked such that Flow 2 has a highest priority and Flow 3 has a lowest priority. The MAC module 112 fills PDU 202 with data starting from Flow 2 until Flow 2 is exhausted of data, a maximum supported E-TFC is reached, or up to a serving grant. After allocation of data from Flow 2, the MAC module 112 can fill PDU 202 with data from Flow 1, if a capacity of PDU 202 allows for such allocation. The MAC module 112 can allocate data from Flow 1 until no more data is queued on Flow 1 or up to a non-scheduled grant value or a maximum E-TFC size. In indicated with the second example, a possibility exists that non-scheduled flows (e.g., flow 1) can be blocked by scheduled flows with higher priority (e.g., flow 2), but not by scheduled flows with lower priority (e.g., flow 3).

Figure 3:
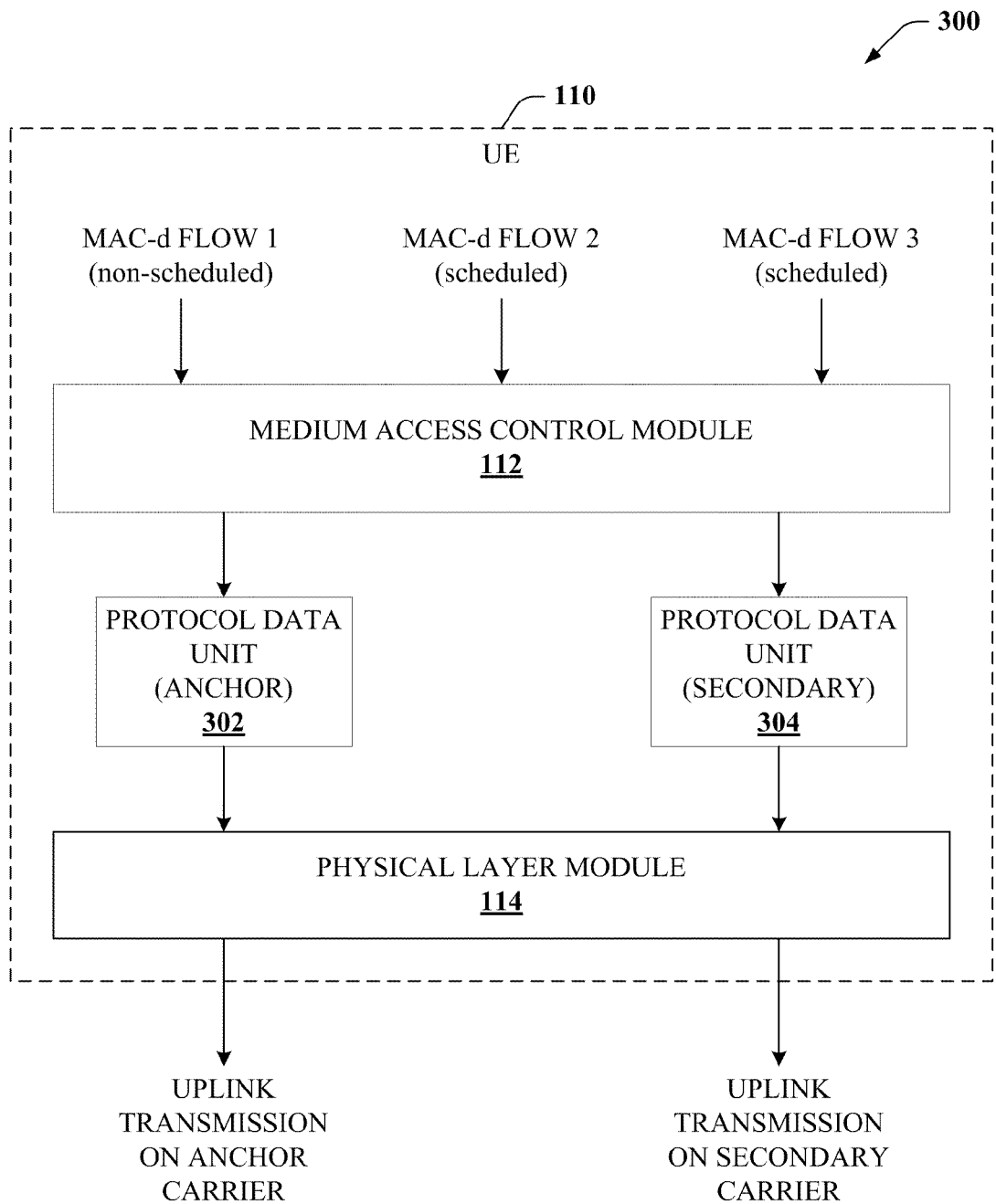
FIG. 3 is an illustration of an example system that facilitates multiplexing of one or more data flows to be transmitted on a multi-carrier enhanced uplink in accordance with various aspects.

Referring now FIG. 3, a system 300 that facilitates multiplexing of one or more data flows to be transmitted on a multi-carrier enhanced uplink is illustrated. System 300 can include a UE 110 configured to utilize two carriers. In an aspect, UE 110 can include a MAC module 112 that can multiplex one or more MAC-d flows (e.g., data flows) into a protocol data unit (PDU) 302 in accordance with a packet format and/or a PDU 304. The packet format can be identified by the MAC module 112 via E-TFC selection as described supra for multi-carrier configurations. UE 110 can further include a physical layer module 114 configured to transmit the PDUs 302 and 304, via a transmitter and one or more antennas, to a base station on two enhanced uplink channels associated with respective carriers. In an aspect, PDU 302 can be associated with a primary or anchor carrier and PDU 304 can be associated with a secondary or non-anchor carrier.

As described above, transmit power can be pre-allocated for non-empty non-scheduled flows prior to splitting power among a plurality of carriers. In one aspect, transmit power is pre-allocated to an anchor carrier. After power splitting and E-TFC selection, data allocation can start with a secondary or non-anchor carrier and data flows can be served in accordance with associated logical channel priorities.

In an example, a maximum power allowed for transmission by UE 110 on each activated uplink frequency (e.g., carrier) can be determined. Determining the maximum power facilitates E-TFC selection for each activated uplink frequency, while accounting for non-scheduled flows. In an aspect, transmit power can be pre-allocated for non-scheduled flows with data. In one example, more than one non-scheduled flow can be present, accordingly, transmit power can be pore-allocated sequentially based upon priority of the non-scheduled flows. An amount of power pre-allocated to a particular non-scheduled flow can be based upon a minimum among at least three power levels: a remaining power available, a power necessary to transmit data up to a non-scheduled grant associated with the flow, or a power necessary to transmit all data in the non-scheduled flow. To ascertain the latter two power levels, a power offset can be selected from a HARQ profile of a highest profile data flow with data.

A remaining power, after pre-allocation of power to non-empty non-scheduled flows, can be split among activated uplink frequencies. An allocated power, Pi, on carrier i, can be represented as $(P_{max}/\Sigma P_{SG,j})P_{SGj}$, wherein $P_{SGj}$ indicates a power required by a serving grant on uplink frequency j (e.g., carrier j) and $P_{max}$ represents a remaining transmit power of UE 110 after power pre-allocation. In another example, when there is one retransmission and one new transmission in a dual carrier configuration and $P_{max}/\Sigma P_{SG,j} > 1$, power allocated to a carrier with a retransmission can be a power required by a retransmitted packet. Remaining power after allocation to the carrier with the retransmission can be allocated to a carrier with the new transmission.

In accordance with another example where there is one retransmission and one new transmission in a dual carrier configuration, power can be unconditionally allocated to the carrier with the retransmission. For instance, power for the retransmission can be allocated to the carrier with the retransmission prior to performing a power split. Under this unconditional approach, remaining power, after allocation to the carrier with the retransmission, includes power pre-allocated to non-empty non-scheduled flows.

Pursuant to this example, on the primary uplink carrier (e.g., the anchor carrier), a maximum power allowed for transmission can be a sum of a total power pre-allocated for non-empty non-scheduled data flows and a power allocated to the primary uplink carrier by the power split. For the secondary uplink carrier, a maximum power allowed for transmission can be a power allocated to the secondary uplink carrier by the power split.

After the maximum power allowed for transmissions on the primary uplink carrier and secondary primary uplink carrier, the MAC module 112 can implement E-TFC selection. In an aspect, E-TFC selection, on each carrier, can be similar, in the multi-carrier configuration of FIG. 3, to the single-carrier E-TFC selection procedure described supra with respect to FIG. 2.

In an aspect, as an alternative to pre-allocation, no power reservations for non-scheduled flows can be provided. Under this alternative, non-scheduled flows can be blocked by lower priority scheduled flows. For instance, a serving grant on the anchor carrier can be low while the non-scheduled flow has a high priority. In this situation, power allocated to the anchor carrier by the power split can be insufficient to support the non-scheduled flow while lower priority scheduled flows employ power on the secondary carrier. In an example, UE 110 can include three MAC-d flows. MAC-d Flow 1 can be a non-scheduled flow while MAC-d Flows 2 and 3 can be configured as scheduled flows. The MAC-d flows can be ranked according to priority such that Flow 1 has a highest priority and Flow 3 has a lowest priority. A serving grant on the anchor carrier can accommodate 0 bits while a serving grant on the secondary carrier can accommodate 600 bits. A non-scheduled grant associated with non-scheduled Flow 1 can comprise 500 bits. Respective queue lengths for Flows 1-3 can be 100 bits, 500 bits, and 1000 bits. When UE 110 is power limited, the MAC module 112 can perform a power split and allocate sufficient power to the anchor carrier to transmit 0 bits and sufficient power to the secondary carrier to transmit 400 bits. Pursuant to this example, MAC module 112 allocated 400 bits from Flow 2 to the secondary carrier while no data from Flows 1 or 3 is allocated. Accordingly, Flow 1 is blocked by lower priority Flow 2.

According to another alternative, power reservation can occur only when a non-scheduled flow has a highest priority among all flows. Under this alternative, non-scheduled flows can be blocked by lower priority scheduled flows. For example, Flow 1 can be a non-scheduled flow while MAC-d Flows 2 and 3 can be configured as scheduled flows. The MAC-d flows can be ranked according to priority such that Flow 2 has a highest priority and Flow 3 has a lowest priority. A serving grant on the anchor carrier can accommodate 300 bits while a serving grant on the secondary carrier can accommodate 600 bits. A non-scheduled grant associated with non-scheduled Flow 1 can comprise 500 bits. Respective queue lengths for Flows 1-3 can be 500 bits, 200 bits, and 2000 bits. When UE 110 is power limited, the MAC module 112 can perform a power split and allocate sufficient power to the anchor carrier to transmit 200 bits and sufficient power to the secondary carrier to transmit 400 bits. Since the non-scheduled flow (e.g., Flow 1) is not highest priority, no power is reserved for the flow. The MAC module 112 can start data allocation from the anchor carrier. When allocation follows strict priority, the MAC module 112 sends 200 bits of Flow 2 on the anchor carrier and 400 bits of Flow 3 on the secondary carrier. Accordingly, Flow 1 is blocked by lower priority Flow 3. In another example, the MAC module 112 can start data allocation from the secondary carrier. When allocation follows strict priority, the MAC module 112 sends 200 bits of Flow 2 and 200 bits of Flow 3 on the secondary carrier and 200 bits of Flow 1 on the anchor carrier. Accordingly, Flow 1 is not fully served before power is utilized by lower priority Flow 3.

To prevent non-scheduled flows from being blocked by lower priority flows, the MAC module 112, in the multi-carrier configuration, executes data allocation or E-TFC selection sequentially, starting with the secondary or non-anchor carrier. In addition, non-scheduled flows are restricted to the anchor carrier. Accordingly, MAC module 112 fills PDU 304 first with data from scheduled flows 2 and 3 before allocating data to PDU 302 from non-scheduled flow 1 and/or any other flows not already served.

Figure 4:
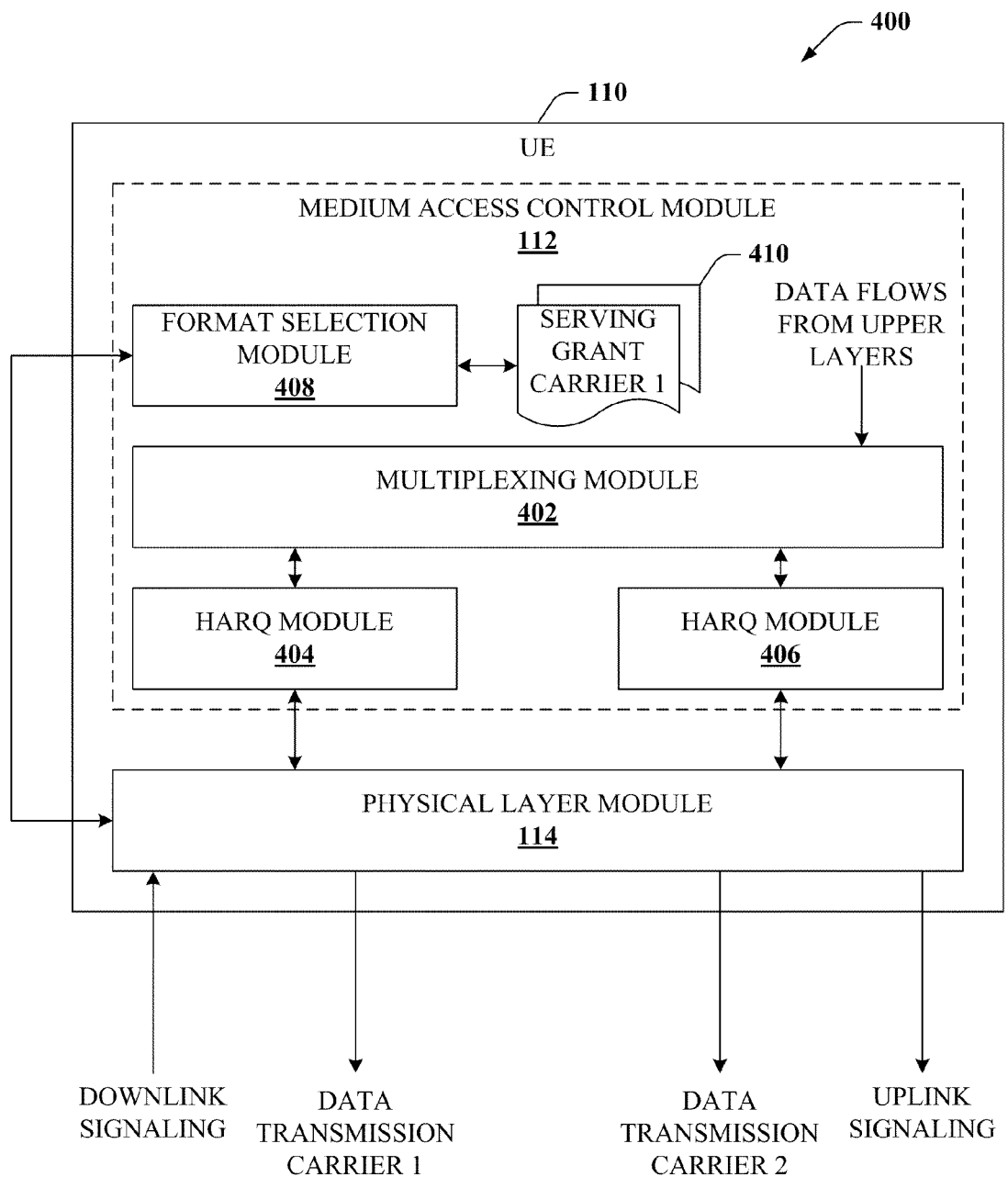
FIG. 4 is an illustration of an example system that facilitates transmitting high speed uplink data on a plurality of carriers in accordance with various aspects.

Turning now to FIG. 4, a system 400 is depicted that facilitates transmitting high speed uplink data on a plurality of carriers in accordance with various aspects. System 400 can include a UE 110, which can be similar to and perform similar functionality as UE 110 described above with respect to FIG. 1. UE 110 can receive downlink signaling from a base station, such as base station 120. In addition, UE 110 can transmit uplink signaling and uplink data transmissions to the base station.

In one aspect, UE 110 can be configured to utilize multiple component carriers for enhanced uplink or HSUPA transmissions. Each component carrier, in a carrier aggregation configuration, can include full enhanced uplink capabilities. Accordingly, downlink signaling, uplink signaling, and uplink data transmissions can be received and transmitted separately on each component carrier. Downlink signaling can include, for example, absolute and relative scheduling grants for each carrier configured. Uplink signaling can include scheduling requests for each carrier, E-TFC selections for each carrier, power headroom, buffer status reports, and the like.

In an example, UE 110 can be configured to employ two carriers (e.g., carriers 1 and 2). UE 110 can include a MAC module 112 which can perform packet format selection, power allocation, and multiplexing of one or more flows (e.g., MAC-d flows on the logical channels) into a selected packet format. The MAC module 112 can include a multiplexing module 402 which can multiplex one or more MAC-d PDUs into one or more MAC-e PDUs, which are in turn packaged into a MAC-es PDU or transport block. The multiplexing module 402 packages PDUs into the transport block in accordance with a packet format or E-TFC chosen by a format selection module 408. In an aspect, a transport block is transmitted by the physical layer module 114 for each carrier configured. Accordingly, the format selection module 408, for a given TTI, can select one or more E-TFCs, up to one for each carrier, depending on HARQ status of respective E-DCH transmissions. In the example of two configured carriers, each with a new transmission for a TTI, the format selection module 408 selects two E-TFCs, one per carrier. The multiplexing module 402 can determine which MAC-d flows are allocated to the selected E-TFCs.

The MAC module 112 can further include one or more HARQ modules 404 and 406. In an aspect, independent HARQ modules 404 and 406 can be associated with each configured carrier. For instance, HARQ module 404 can be associated with a primary or anchor carrier, while HARQ module 406 is associated with a secondary or non-anchor carrier. The HARQ modules 404 and 406 implement MAC functionality related to a HARQ protocol. For respective carrier associated with a particular HARQ module 404 or 406, the HARQ module 404 or 406 can retain transport blocks for retransmission. The HARQ modules 404 and 406 can be configured by radio resource control (RRC) and provides transport blocks to the physical layer module 114 for transmission on respective component carriers.

As discussed supra, the multiplexing module 402 of the MAC module 112 packages PDUs from various data flows into transport blocks in accordance with packet formats or E-TFCs selected on each carrier. In an aspect, the E-TFCs are identified by the format selection module 406 based at least in part on scheduling grants received form a base station via downlink signaling. Scheduling grants can be absolute scheduling grants received on E-AGCH or relative grants received on E-RGCH. For each scheduling grant received, MAC module 112 updates serving grants 410, wherein individual serving grants are maintained per configured carrier. The serving grants 410 indicate to UE 110 a maximum data rate or transmit-to-pilot (T2P) power ratio is allowed to employ for transmissions on respective carriers. MAC module 112 updates the serving grants 410 when an absolute and/or relative scheduling grant is received through downlink signaling on one or more carriers. For example, an absolute grant can be received on E-AGCH of a first carrier. The MAC module 112 updates the serving grant 410 associated with the first carrier to be equivalent to the absolute grant. In another example, a relative grant can be received on E-RGCH of a second carrier. The MAC module 112, in response to the relative grant, can increment or decrement the serving grant 410 associated with the second carrier by an amount equivalent to the relative grant, depending on whether the relative grant is an increase or decrease in the maximum allowed data rate.

In an aspect, for single-carrier configurations, E-TFC selection includes E-TFC restriction. Every TTI, a state, in terms of supported or blocked, of each E-TFC is updated for each MAC-d flow. The state of an E-TFC can be determined based upon remaining power or a normalized remaining power margin (NRPM). For example, the NRPM for an E-TFC candidate j can be defined as:

$$NRPM_j = (PMax_j - P_{DPCCH,target} - P_{DPDCH} - P_{HS\text{-}DPCCH} - P_{E\text{-}DPCCH,j})/P_{DPCCH,target}$$

Pursuant to this example, $PMax_j$ is a maximum transmitter power for E-TFC candidate j, $P_{DPCCH,target}$ is a slotwise estimate of DPCCH transmit power, $P_{DPDCH}$ is an estimate DPDCH transmit power, $P_{HS\text{-}DPCCH}$ is an estimated HS-DPCCH transmit power, and $P_{E\text{-}DPCCH,j}$ is an estimated E-DPCCH transmit power relative to E-TFC candidate j.

For multi-carrier configurations, such as the dual-carrier configuration depicted in FIG. 4, normalized remaining power margins on each carrier can be determined from a total remaining power. The total remaining power can be split between the carriers (in a dual-carrier configuration) in accordance with respective serving grants. In one aspect, the total remaining power can be split proportionally with respect to the serving grants. According to an example, the total remaining power can be ascertained, without MPR consideration, based upon the following:

$$P_{remaining} = (MaxAllowedULTxPower) - \Sigma_k P_{DPCCH,target,k} - \Sigma_k P_{reserved,k} - P_{HS\text{-}DPCCH}$$

Pursuant to this example, MaxAllowedULTxPower is a maximum allowed uplink transmit power and can be set by the wireless communication network. $P_{DPCCH,target,k}$ can represent a filtered DPCCH power on frequency k (e.g., carrier k), $P_{reserved,k}$ can represent power pre-allocated on frequency k for non-scheduled flows and transmissions of scheduling information, and $P_{HS\text{-}DPCCH}$ can represent an estimated HS-DPCCH transmit power based on $P_{DPCCH,target,primary}$ (e.g., a fileter DPCCH power on the anchor carrier), a maximum HS-DPCCH gain factor, and most recent signaled values of $\Delta_{ACK}$, $\Delta_{NACK}$, and $\Delta_{CQI}$. A maximum transmit power allowed on a carrier i, $P_{allowed,i}$, for i=1,2, can be denoted:

$$P_{allowed,i} = \frac{P_{remaining} * P_{DPCCH,target,i} * SG_i}{\sum_k (P_{DPCCH,target,k} * SG_k)}$$

In an example, E-TFC selection can be invoked by one HARQ entity (e.g., HARQ module 404 or HARQ module 406), which indicates there is one retransmission and one new transmission. In this situation, a carrier on which E-TFC selection is invoked can be denoted as carrier 1 and the other carrier can be carrier 2. When $P_{allowed,1} < (P_{DPCCH,target,1})$ ($SG_1$) or $P_{allowed,2}$ is less than a power required for the retransmission, then $P_{allowed,2}$ can be established to an actual transmit power utilized on carrier 2. $P_{allowed,1}$ can be the difference between $P_{remaining,init}$ and $P_{allowed,2}$, where $$P_{remaining,init} = (MaxAllowedULTxPower) - \Sigma_k P_{DPCCH,target,k} - P_{HS\text{-}DPCCH}$$

Pursuant to this example, $P_{remaining,init}$ represents a remaining power after allocation for the retransmission, wherein the remaining power includes power reserved for non-scheduled flows.

In another example, the power required for the retransmission can be unconditionally allocated to carrier 2. For instance, prior to the power split described above, $P_{allowed,2}$ can be established as the power required for the retransmission. Remaining power, after allocation for retransmissions, can be split (e.g., as described above, or according to another split scheme).

For each uplink carrier, UE 110 can estimate the NRPM available for E-TFC selection in accordance with the following examples with respect to E-TFC candidate j. In an aspect, UE 110 can sequentially estimate NRPM for each carrier, starting with either the anchor carrier or the secondary carrier. In another aspect, UE 110 can jointly estimate NRPM for each carrier.

In an example where estimation starts with the anchor carrier, then the NRPM on the anchor carrier can be determined based upon the following:

$$NRPM_{primary,j} = (P_{allowed,primary,MPR,j} - P_{E\text{-}DPCCH,j})/P_{DPCCH,target,primary}$$

In accordance with this example, $P_{allowed,primary,MPR,j}$ represent a maximum allowed transmit power on the anchor carrier after considering MPR based on E-TFC candidate j. In an aspect, this value can be dependent upon a selected E-TFC and associated e-DPCCH power on the secondary carrier. UE 110 can assume the E-TFC selected on the secondary carrier is the minimum of ($P_{allowed,secondary}/P_{DPCCH,target,secondary}$) and $SG_{secondary}$. $P_{E\text{-}DPCCH,j}$ is an estimated E-DPCCH transmit power associated with E-TFC candidate j. After determination of NRPM on the anchor, NRPM can be derived for the secondary carrier in accordance with the following:

$$NRPM_{secondary,j} = (P_{allowed,secondary,MPR,j} - P_{E\text{-}DPCCH,j})/P_{DPCCH,target,secondary}$$

In an example dual-carrier scenario as depicted in FIG. 4, the format selection module 408 can implement E-TFC restriction on each carrier utilizing respective NRPMs. In an aspect, E-TFC restriction on a carrier can follow E-TFC restriction procedures for single-carrier configurations wherein the remaining power is the NRPM associated with the carrier. Following E-TFC restriction, the multiplexing module 402 and/or the format selection module 408 can continue with E-TFC selection through data allocation procedures. Non-scheduled flows are transmitted only on the anchor carry. As discussed above and shown in the determinations of NRPM, power is reserved for non-scheduled flows on the anchor or primary carrier. To prevent non-scheduled flows from being blocked by lower priority scheduled flows, the multiplexing module 402 commences data allocation with the secondary or non-anchor carrier and follows a strict priority among MAC-d flows. Accordingly, the multiplexing module 402 generates a PDU on the secondary carrier which contains data from one or more scheduled flows in accordance priorities. The multiplexing module 402 then generates a PDU on the anchor carrier which contains data from one or more scheduled and/or non-scheduled flows in accordance with priorities. The physical layer module 114 can transmit the PDUs on respective carriers.

Figure 5:
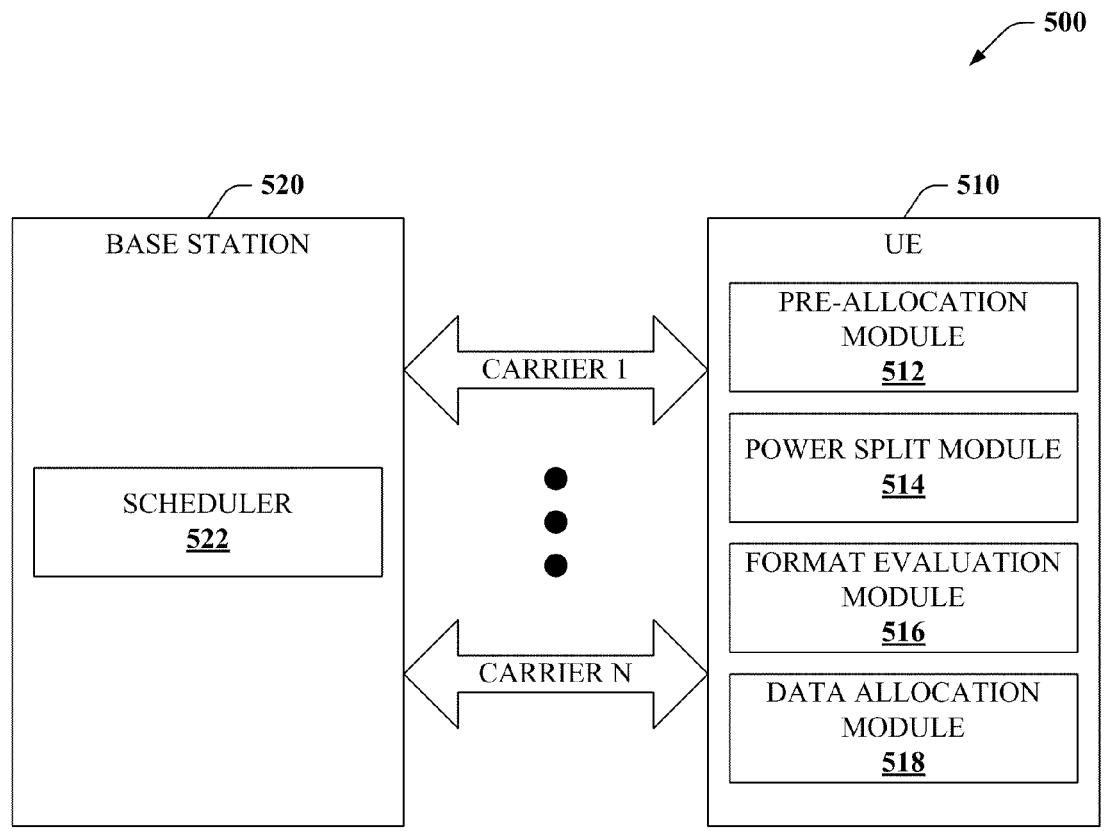
FIG. 5 is an illustration of an example system that facilitates power distribution and data allocation for a multi-carrier uplink configuration in accordance with various aspects.

FIG. 5 illustrates a wireless communication system 500 that facilitates power distribution and data allocation for a multi-carrier uplink configuration in accordance with various aspects. As FIG. 5 illustrates, system 500 can include a UE 510, which can communicate with a base station 520. In an aspect, UE 510 can be configured to utilize a plurality of carriers to transmit information on the uplink. For instance, UE 510 can employ carriers 1 through carrier N, where N is an integer greater than or equal to two. Each carrier, 1 through N, can include a set of downlink channels and a set of uplink channels. Accordingly, in one example, each carrier can operate as a complete wireless communication system. In another example, one carrier (e.g., carrier 1) can be configured as an anchor carrier.

In one example, UE 510 receives scheduling grants (e.g., absolute and/or relative scheduling grants) on each carrier. The scheduling grants indicate a maximum T2P power ratio UE 510 can employ for an enhanced uplink or HSUPA transmission on E-DCH, and consequently, the data rate. UE 510 utilizes the scheduling grants to update serving grant variables maintained internally. In an aspect, UE 510 maintains individual serving grant variables for each carrier 1 through N.

To facilitate scheduling (e.g., determination of scheduling grants), UE 510 can transmit a scheduling request to base station 520. UE 510 can transmit a separate request on each carrier UE 510 desires to employ for a given TTI. A scheduler 522 of base station 520 can determine scheduling grants based at least in part on scheduling requests. In an aspect, scheduler 522 determines when and at what data rate UE 510 is allowed to transmit on an uplink in order to control an amount of interference affecting other UEs (not shown) associated with base station 520. The scheduler 522 can determine absolute and/or relative scheduling grants for UE 510 and can determine the grants in a joint manner across carriers, or individually for each carrier. The scheduling grants are transmitted to UE 510 via downlink signaling. In one aspect, separate scheduling grants are transmitted on each carrier configured.

In an aspect, the scheduling/serving grants relate to scheduled data or MAC-d flows configured on UE 510. Non-scheduled flows are not associated with scheduling or serving grants but, rather, retain a non-scheduled grant value. Non-scheduled flows can be low data rate, delay sensitive flows. As non-scheduled flows are typically low data rate, such flows do not always benefit from utilizing multiple carriers. However, non-scheduled flows can be delay sensitive and should not be disrupted in multi-carrier configurations.

To accommodate non-scheduled flows, the wireless communication system 500 can restrict non-scheduled flows to anchor carriers when a UE is configured for multiple carriers. As discussed supra, power splitting between carriers can be based upon respective serving grants. Thus, power splitting alone can starve non-scheduled flows by not providing sufficient power on the anchor carrier. UE 510 can employ a pre-allocation module 512 which reserves transmit power for non-scheduled flows on the anchor carrier. Remaining power, after power reservation, can be distributed among all carriers 1 through N by a power split module 514. In an aspect, power split module 514 can employ a sequential power split mechanism (e.g., greedy-filling, water-filling, etc.) or a parallel power split mechanism (e.g., proportional). After respective allowed transmit power amounts are identified on carrier, a format evaluation module 516 can execute E-TFC restriction. The format evaluation module 516, based at least in part on the allowed transmit power amounts, can determine a normalized remaining power margin for each carrier. For each MAC-d flow and for each carrier, the format evaluation module 516 can update a state of each E-TFC in accordance with the normalized remaining power margins. After E-TFC restriction, UE 510 can employ a data allocation module 518 to distribute data from one or more MAC-d flows to respective PDUs associated with carriers 1 through N. In one aspect, the data allocation module 518 sequentially allocates data from the one or more MAC-d flows starting with a secondary or non-anchor carrier.

Figure 6:
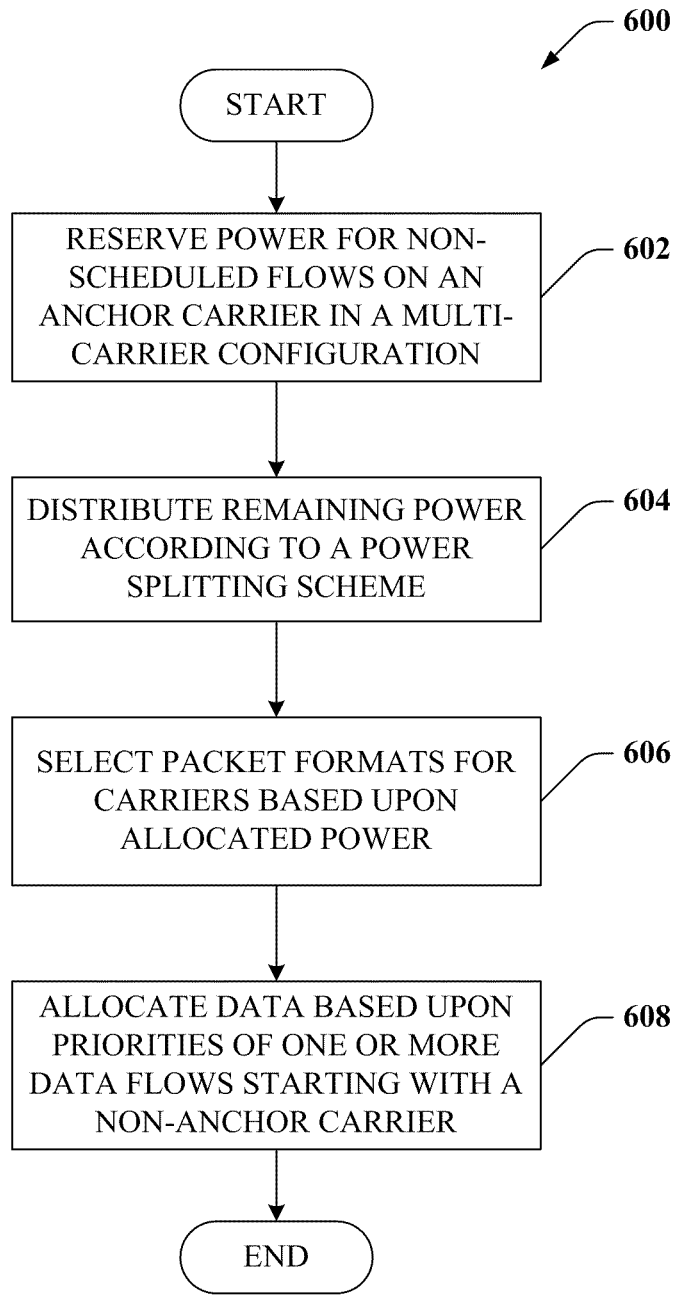
FIG. 6 is an illustration of an example methodology for supporting non-scheduled data flows in a multi-carrier configuration in accordance with various aspects.
Figure 7:
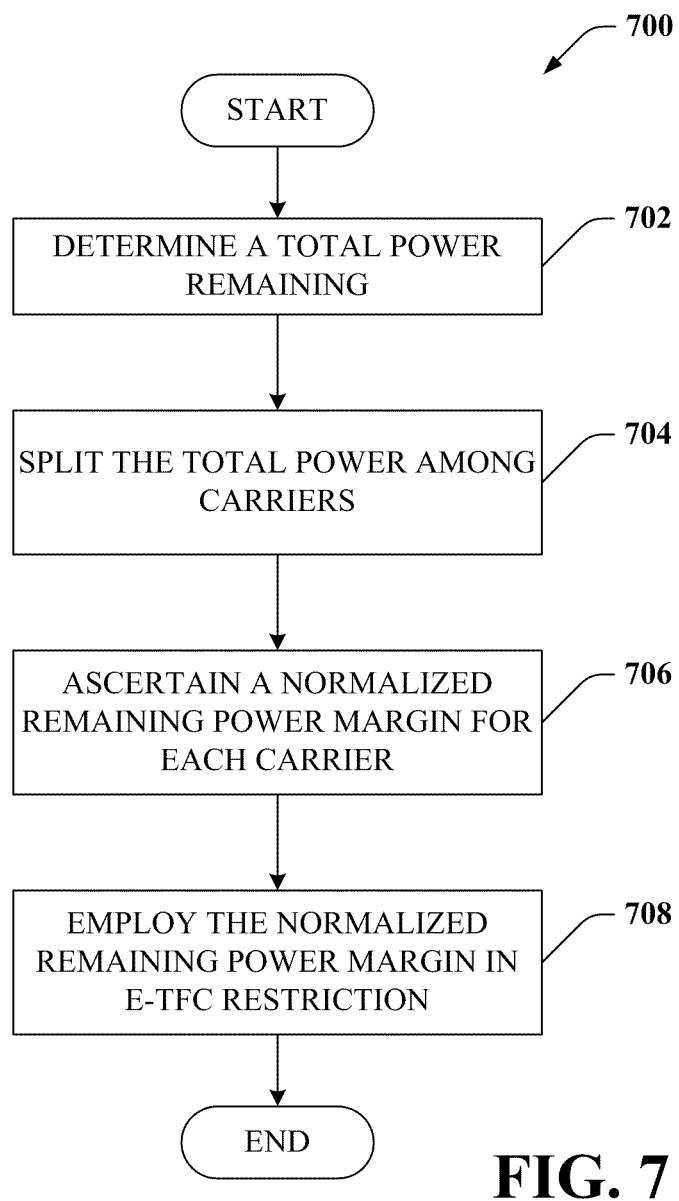
FIG. 7 is an illustration of an example methodology for estimating a normalized remaining power margin which supports packet format restriction, packet format selection, and happy bit generation in accordance with various aspects.

Referring to FIGS. 6-7, methodologies related to facilitating E-TFC selection for multi-carrier uplink transmissions are described. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, illustrated is a method 600 for supporting non-scheduled data flows in a multi-carrier configuration of a wireless communication system. At reference numeral 602, power is reserved for non-scheduled flows. In an aspect, power can be reserved on an anchor carrier in a multi-carrier configuration. At reference numeral 604, remaining power, after power reservation, can be distributed among a plurality of carriers in the multi-carrier configuration in accordance with a splitting scheme. The splitting scheme can be a sequential scheme or a parallel scheme. In addition, the anchor carrier is included in the power split such that a total power allocated to the anchor carrier is a sum of the reserved power and power allocated, to the anchor carrier, by the power splitting scheme.

At reference numeral 606, packet formats are selected for carriers based upon allocated power. For example, on each carrier and for each data flow, packet formats can be classified as supported or blocked based upon the allocated power and a power requirement of each packet format. At reference numeral 608, data, from one or more data flows, can be allocated to protocol data units (PDUs) associated with respective carriers. In an aspect, data allocation starts placing data to PDUs associated with non-anchor carriers. In addition, data is taken from the one or more data flows in accordance with priorities associated with respective data flows.

Referring now to FIG. 7, a method 700 is depicted that facilitates estimating a normalized remaining power margin which supports packet format restriction, packet format selection, and happy bit generation in accordance with various aspects. At reference numeral 702, a total power remaining is determined. At reference numeral 704, the total power remaining is split among carriers. At reference numeral 706, a normalized remaining power margin (NRPM) is ascertained for each carrier based at least in part on the power split among carriers. At reference numeral 708, the NRPM for each carrier is employed to perform E-TFC restriction.

It will be appreciated that, in accordance with one or more aspects described herein, inferences can be made regarding determining a power reservation size, employing a distribution scheme, allocation power among carriers, allocating data among carriers, estimating transmit powers, estimating remaining power, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic— that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
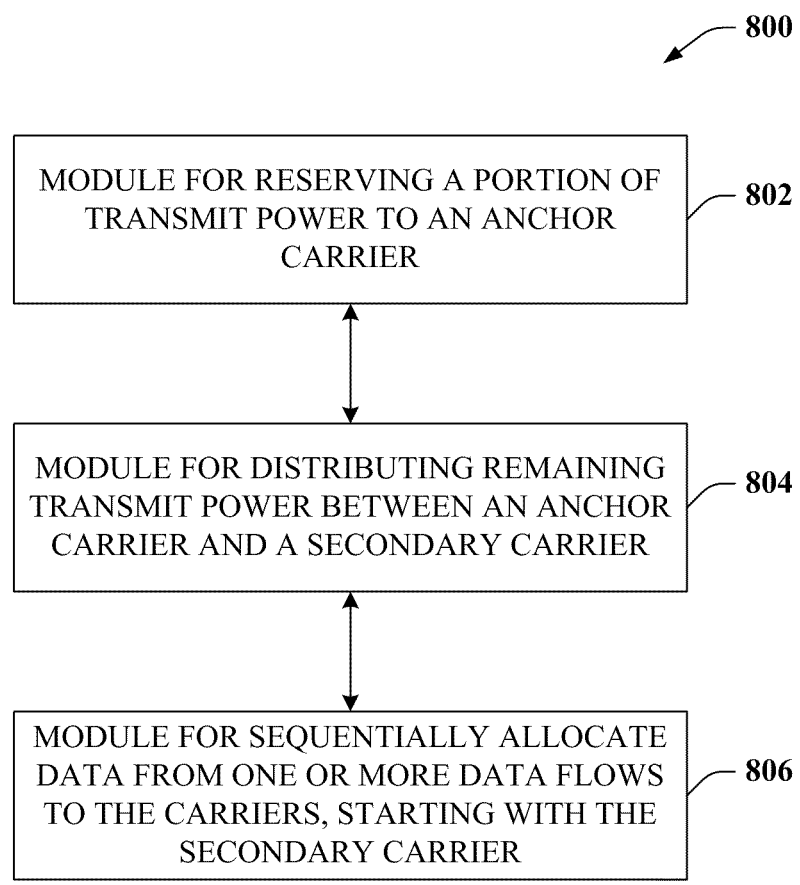
FIG. 8 is an illustration of an example apparatus that facilitates distribution of transmit power and data among a plurality of component carriers in accordance with various aspects.

Referring next to FIG. 8, an apparatus 800 that facilitates distribution of transmit power and data among a plurality of component carriers in accordance with various aspects. It is to be appreciated that apparatus 800 is represented as including functional blocks, which can be functional blocks that represent functions implemented by a processor, software, or combination thereof (e.g., firmware). Apparatus 800 can be implemented by a user device (e.g., UE 110) and/or any other suitable network entity and can include a module 802 for reserving a portion of transmit power to an anchor carrier, a module 804 distributing remaining transmit power between an anchor carrier and a secondary carrier, and a module 806 sequentially allocate data from one or more data flows to the carriers, starting with the secondary carrier.

Figure 9:
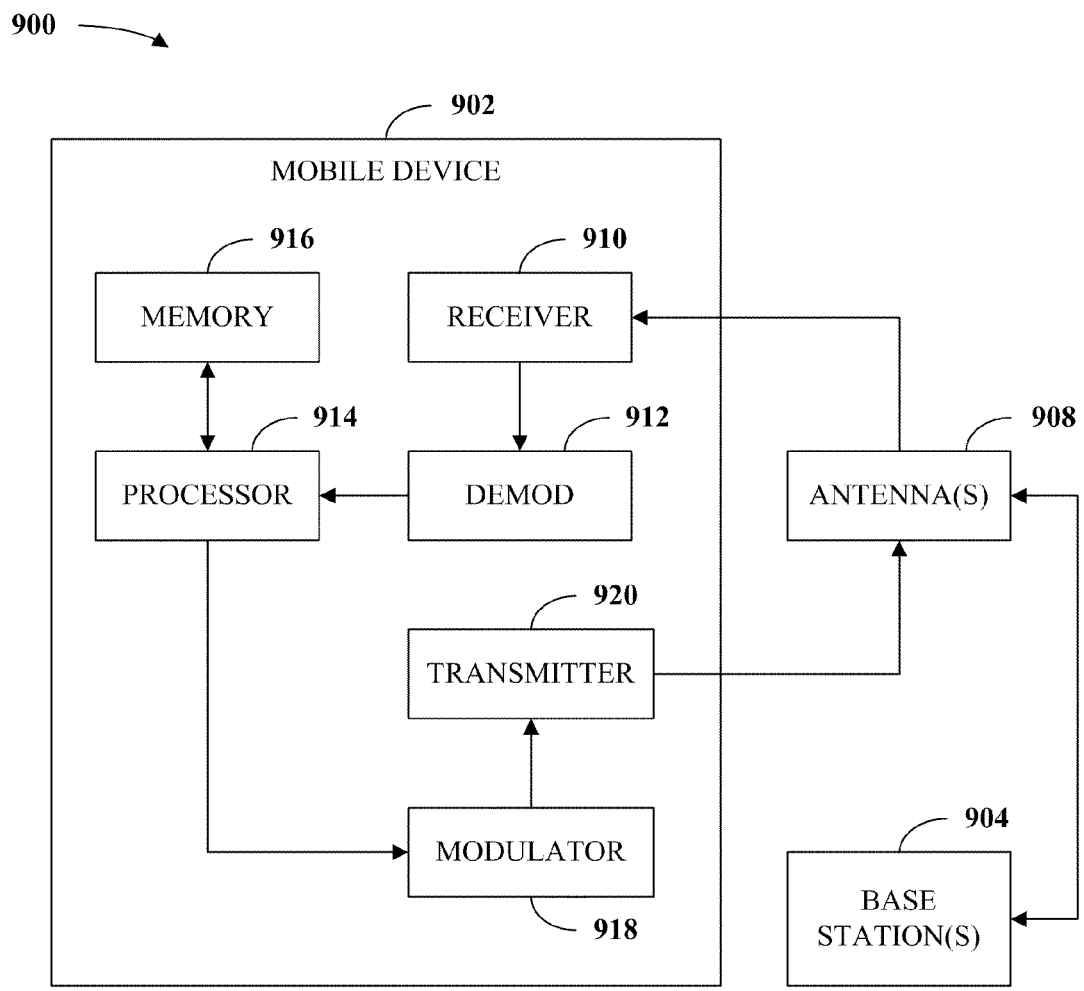
FIGS. 9-10 are block diagrams of respective wireless communication devices that can be utilized to implement various aspects of the functionality described herein.

FIG. 9 is a block diagram of another system 900 that can be utilized to implement various aspects of the functionality described herein. In one example, system 900 includes a mobile device 902. As illustrated, mobile device 902 can receive signal(s) from one or more base stations 904 and transmit to the one or more base stations 904 via one or more antennas 908. Additionally, mobile device 902 can comprise a receiver 910 that receives information from antenna(s) 908. In one example, receiver 910 can be operatively associated with a demodulator (Demod) 912 that demodulates received information. Demodulated symbols can then be analyzed by a processor 914. Processor 914 can be coupled to memory 916, which can store data and/or program codes related to mobile device 902. Mobile device 902 can also include a modulator 918 that can multiplex a signal for transmission by a transmitter 920 through antenna(s) 908.

Figure 10:
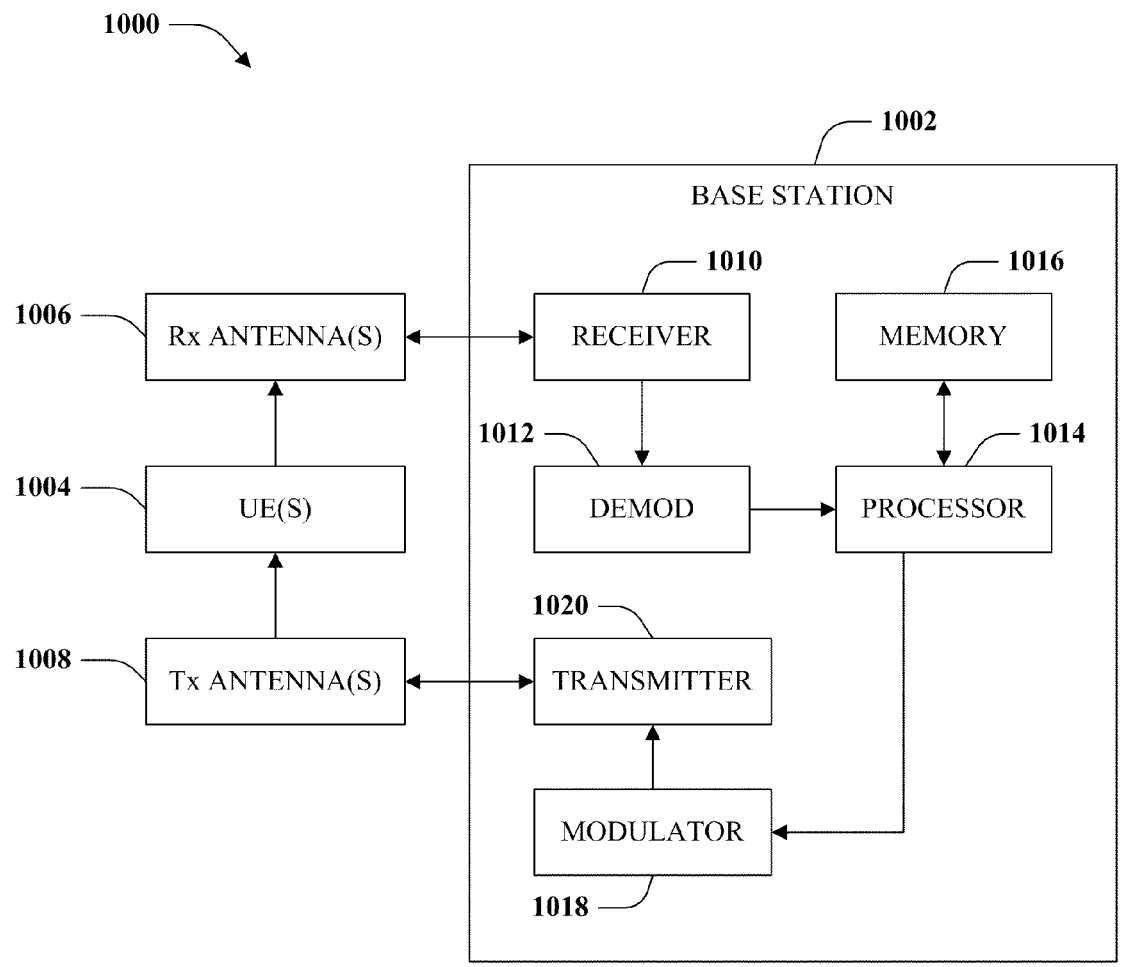

FIG. 10 is a block diagram of a system 1000 that can be utilized to implement various aspects of the functionality described herein. In one example, system 1000 includes a base station or base station 1002. As illustrated, base station 1002 can receive signal(s) from one or more UEs 1004 via one or more receive (Rx) antennas 1006 and transmit to the one or more UEs 1004 via one or more transmit (Tx) antennas 1008. Additionally, base station 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. Base station 1002 can also include a modulator 1018 that can multiplex a signal for transmission by a transmitter 1020 through transmit antenna(s) 1008.

Figure 11:
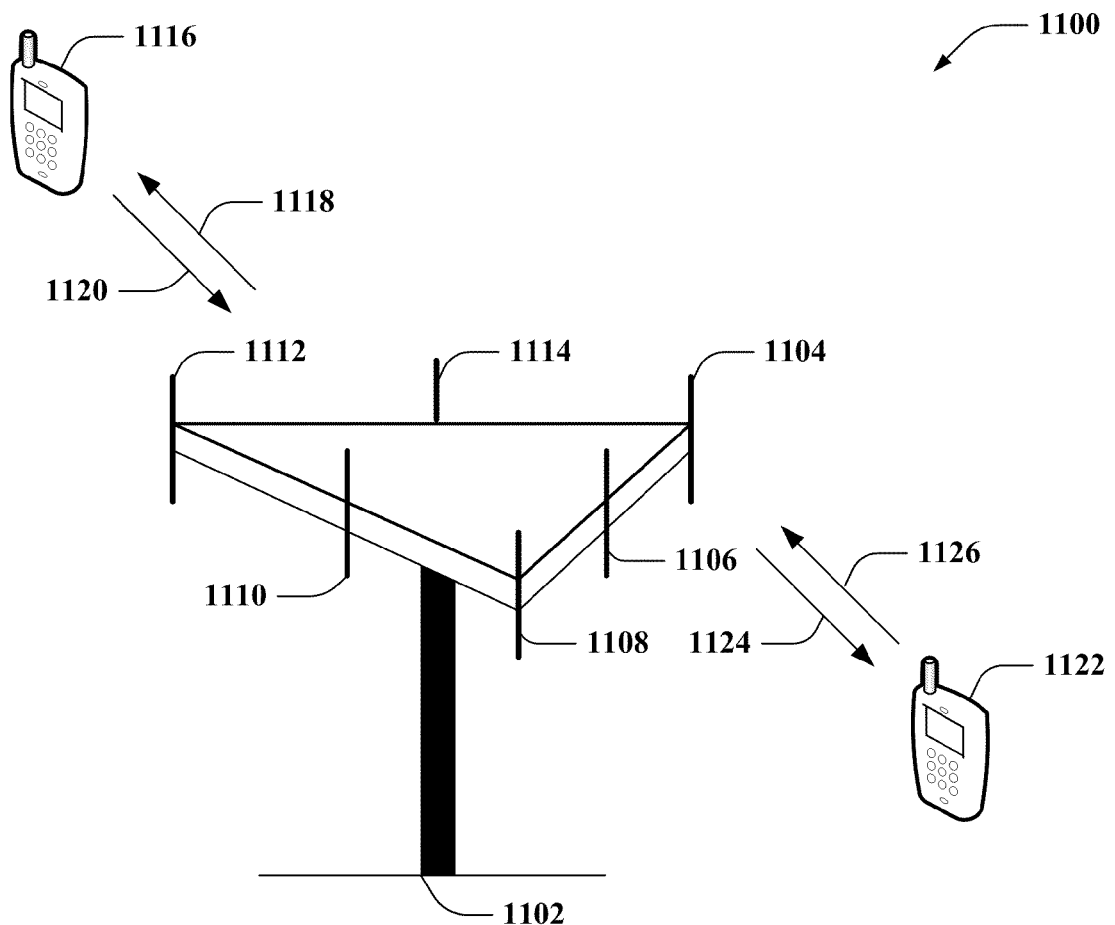
FIG. 11 is an illustration of a wireless communication system in accordance with various aspects set forth herein.

Referring now to FIG. 11, a wireless communication system 1100 is illustrated in accordance with various embodiments presented herein. System 1100 comprises a base station (e.g., access point) 1102 that can include multiple antenna groups. For example, one antenna group can include antennas 1104 and 1106, another group can comprise antennas 1108 and 1110, and an additional group can include antennas 1112 and 1114. Two antennas are illustrated for each antenna group; however, more or fewer antennas can be utilized for each group. Base station 1102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1102 can communicate with one or more UEs such as UE 1116 and UE 1122; however, it is to be appreciated that base station 1102 can communicate with substantially any number of UEs similar to UEs 1116 and 1122. UEs 1116 and 1122 can be, for example, cellular phones, smart phones, laptops, handheld communication devices, handheld computing devices, satellite radios, global positioning systems, PDAs, and/or any other suitable device for communicating over wireless communication system 1100. As depicted, UE 1116 is in communication with antennas 1112 and 1114, where antennas 1112 and 1114 transmit information to UE 1116 over a downlink 1118 and receive information from UE 1116 over an uplink 1120. Moreover, UE 1122 is in communication with antennas 1104 and 1106, where antennas 1104 and 1106 transmit information to UE 1122 over a downlink 1124 and receive information from UE 1122 over an uplink 1126. In a frequency division duplex (FDD) system, downlink 1118 can utilize a different frequency band than that used by uplink 1120, and downlink 1124 can employ a different frequency band than that employed by uplink 1126, for example. Further, in a time division duplex (TDD) system, downlink 1118 and uplink 1120 can utilize a common frequency band and downlink 1124 and uplink 1126 can utilize a common frequency band.

Each group of antennas and/or the area in which they are designated to communicate can be referred to as a sector of base station 1102. For example, antenna groups can be designed to communicate to UEs in a sector of the areas covered by base station 1102. In communication over downlinks 1118 and 1124, the transmitting antennas of base station 1102 can utilize beamforming to improve signal-to-noise ratio of downlinks 1118 and 1124 for UEs 1116 and 1122. Also, while base station 1102 utilizes beamforming to transmit to UEs 1116 and 1122 scattered randomly through an associated coverage, UEs in neighboring cells can be subject to less interference as compared to a base station transmitting through a single antenna to all its UEs. Moreover, UEs 1116 and 1122 can communicate directly with one another using a peer-to-peer or ad hoc technology (not shown).

According to an example, system 1100 can be a multiple-input multiple-output (MIMO) communication system. Further, system 1100 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1102 can communicate to the UEs 1116 and 1122 over the channels, which can be created for various types of data. For example, channels can be created for communicating various types of general communication data, control data (e.g., quality information for other channels, acknowledgement indicators for data received over channels, interference information, reference signals, etc.), and/or the like.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple (NR) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
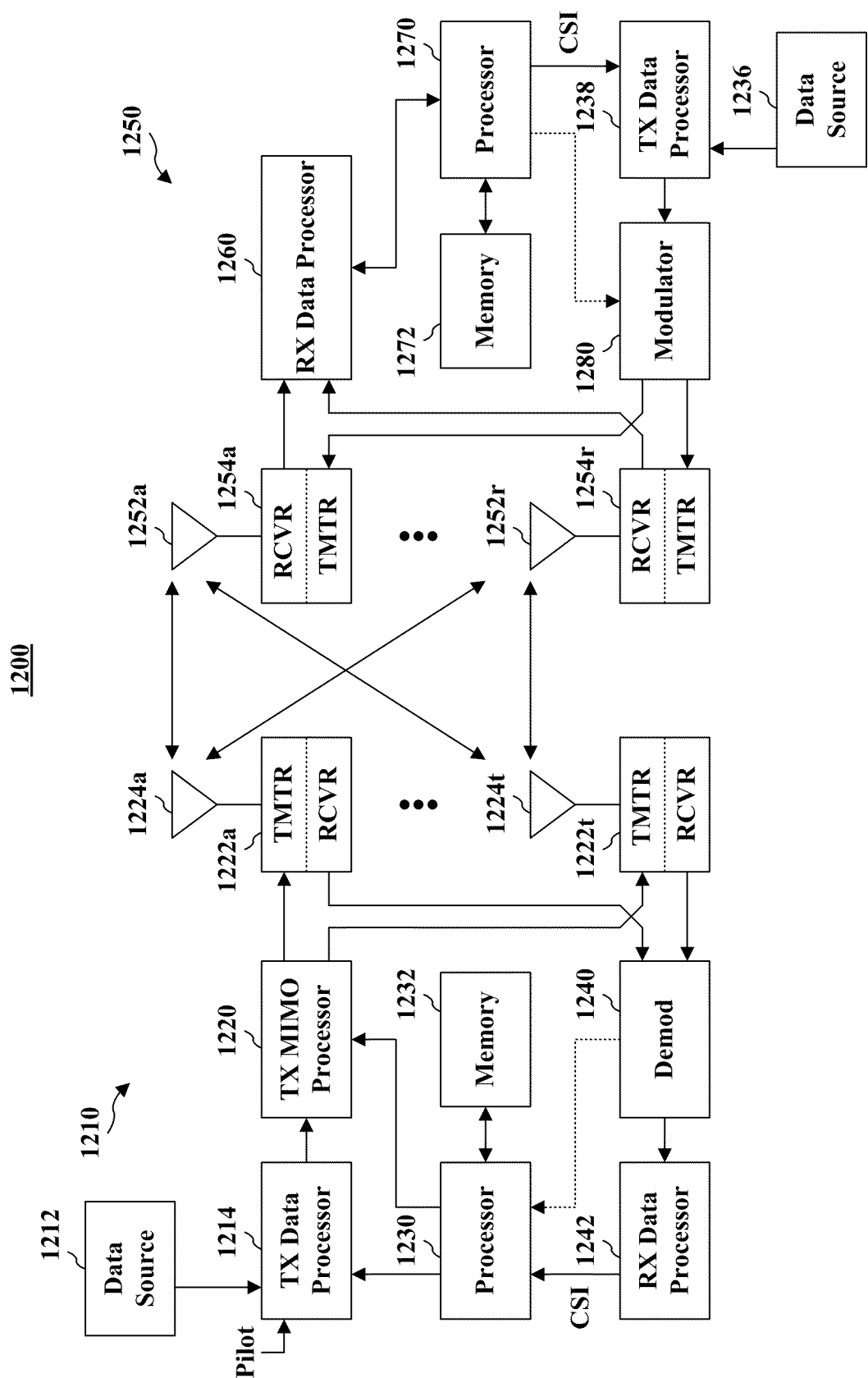
FIG. 12 is a block diagram illustrating an example wireless communication system in which various aspects described herein can function.

FIG. 12 shows an example wireless communication system 1200. The wireless communication system 1200 depicts one base station 1210 and one access terminal 1250 for sake of brevity. However, it is to be appreciated that system 1200 can include more than one base station and/or more than one access terminal, wherein additional base stations and/or access terminals can be substantially similar or different from example base station 1210 and access terminal 1250 described below. In addition, it is to be appreciated that base station 1210 and/or access terminal 1250 can employ the systems (FIGS. 1-5 and FIG. 10) and/or method (FIGS. 6-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At access terminal 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which available technology to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from access terminal 1250 are received by antennas 1224, conditioned by receivers 1222, demodulated by a demodulator 1240, and processed by a RX data processor 1242 to extract the reverse link message transmitted by access terminal 1250. Further, processor 1230 can process the extracted message to determine which precoding matrix to use for determining the beamforming weights.

Processors 1230 and 1270 can direct (e.g., control, coordinate, manage, etc.) operation at base station 1210 and access terminal 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
pre-allocating a portion of transmit power to a first carrier in a plurality of carriers, wherein the first carrier is an anchor carrier;
distributing remaining transmit power, after pre-allocation of the portion, between at least the first carrier and a second carrier of the plurality of carriers;
sequentially allocating data from one or more data flows to at least the first carrier and the second carrier, wherein allocation starts with the second carrier, wherein the second carrier is a non-anchor carrier.

2. The method of claim 1, wherein pre-allocating the portion of transmit power comprises determining the portion of transmit power based upon data requirements of a non-scheduled data flow.

3. The method of claim 2, wherein the portion of transmit power includes power required for a control channel associated with the non-scheduled data flow.

4. The method of claim 2, wherein the portion of transmit power comprises a minimum power among a remaining power available, a power necessary to transmit data up to a non-scheduled grant associated with the non-scheduled data flow, and a power necessary to transmit all data in the non-scheduled data flow.

5. The method of claim 1, further comprising allocating data from a non-scheduled data flow to the first carrier.

6. The method of claim 5, wherein allocating data from the non-scheduled data flow comprises filling a protocol data unit associated with the first carrier with data from the non-scheduled data flow in accordance with at least one of a size of the protocol data unit, a non-scheduled grant, an amount of data in a queue associated with the non-scheduled data flow.

7. The method of claim 1, wherein allocating data from one or more data flows comprises serving the one or more data flows in accordance with priorities associated with the one or more data flows, wherein the one or more data flows are served from a highest priority to a lowest priority.

8. The method of claim 1, further comprising:
identifying a first set of supported packet formats associated with the first carrier; and
identifying a second set of supported packet formats associated with the second carrier, wherein the first set of supported packet formats and the second set of supported packet formats are identified based upon an amount of power distributed to respective carriers.

9. The method of claim 8, wherein the first set of supported packet formats and the second set of supported packet formats are identified every transmission time interval.

10. The method of claim 8, wherein allocating data from one or more data flows to the first carrier comprises filling a protocol data unit in accordance with at least one of the first set of supported packet formats, a serving grant associated with the first carrier, or the amount of power distributed to the first carrier.

11. The method of claim 8, wherein allocating data from one or more data flows to the second carrier comprises filling a protocol data unit in accordance with at least one of the second set of supported packet formats, a serving grant associated with the second carrier, or the amount of power distributed to the second carrier.

12. The method of claim 1, wherein distributing remaining transmit power comprises:
identifying a first maximum transmit power for the first carrier, wherein the first maximum transmit power includes a first amount of power distributed from remaining transmit power and the portion of transmit power pre-allocated to the first carrier; and
identifying a second maximum transmit power for the second carrier, wherein the second maximum transmit power include a second amount of power distributed from remaining transmit power.

13. The method of claim 12, further comprising:
determining a first normalized remaining power margin for the first carrier based at least in part on the first maximum transmit power; and
determining a second normalized remaining power margin for the second carrier based at least in part on the second maximum transmit power.

14. The method of claim 13, further comprising employing the first normalized remaining power margin and the second normalized remaining power margin in at least one of enhanced dedicated channel (E-DCH) transport format combination (E-TFC) restriction or Happy Bit generation.

15. The method of claim 1, wherein distributing remaining transmit power comprises employing a sequential power split mechanism.

16. The method of claim 1, wherein distributing remaining transmit power comprises employing a parallel power split mechanism.

17. The method of claim 1, wherein distributing remaining transmit power further comprises:
identifying a retransmission carrier in the plurality of carriers, wherein the retransmission carrier is associated with a retransmission; and
allocating an amount of power to the retransmission carrier, wherein the amount of power is a power required for the retransmission.

18. The method of claim 17, further comprising distributing, to remaining carriers in the plurality of carriers, any power remaining after allocation of power to the retransmission, wherein power remaining after allocation of power to the retransmission includes the portion of transmit power pre-allocated.

19. A wireless communications apparatus, comprising:
at least one processor configured to:
reserve a portion of transmit power to an anchor carrier in a multi-carrier uplink configuration, wherein the portion of transmit power is based upon data requirements of at least one non-scheduled data flow;
split remaining transmit power, after power reservation to the anchor carrier, among a plurality of carriers including the anchor carrier; and
fill a plurality of protocol data units respectively associated with the plurality of carriers with data from a plurality of data flows in accordance with priorities associated with the plurality of data flows.

20. The wireless communications apparatus of claim 19, wherein the at least one processor is further configured to allocate data from the at least one non-scheduled data flow to a protocol data unit associated with the anchor carrier.

21. The wireless communications apparatus of claim 20, wherein allocation of data from the at least one non-scheduled data flow to the protocol data unit is in accordance with at least one of a size of the protocol data unit, a non-scheduled grant, an amount of data in a queue associated with the at least one non-scheduled data flow.

22. The wireless communications apparatus of claim 19, wherein the at least one processor is further configured to:
determine a first set of supported packet formats associated with the anchor carrier; and
determine a second set of supported packet formats associated with a secondary carrier in the plurality of carriers, wherein the first set of supported packet formats and the second set of supported packet formats are identified based upon an amount of power distributed to respective carriers.

23. The wireless communications apparatus of claim 22, wherein the at least one processor is configured to fill a protocol data unit associated with the anchor carrier in accordance with at least one of the first set of supported packet formats, a serving grant associated with the anchor carrier, or the amount of power distributed to the anchor carrier.

24. The wireless communications apparatus of claim 22, wherein the at least one processor is configured to fill a protocol data unit associated with the secondary carrier in accordance with at least one of the second set of supported packet formats, a serving grant associated with the secondary carrier, or the amount of power distributed to the secondary carrier.

25. The wireless communications apparatus of claim 19, wherein the at least one processor is further configured to sequentially fill the plurality of protocol data units respectively associated with the plurality of carriers with data from the plurality of data flows, wherein the at least one processor starts with a non-anchor carrier from the plurality of carriers.

26. The wireless communications apparatus of claim 19, wherein the at least one processor is further configured to:
identify a first maximum transmit power for the anchor carrier, wherein the first maximum transmit power includes a first amount of power distributed from remaining transmit power and the portion reserved on the anchor carrier; and
identify at least a second maximum transmit power for a secondary carrier in the plurality of carriers, wherein the second maximum transmit power includes a second amount of power distributed from remaining transmit power.

27. The wireless communications apparatus of claim 26, wherein the at least one processor is further configured to:
determine a first normalized remaining power margin for the anchor carrier based at least in part on the first maximum transmit power; and
determine a second normalized remaining power margin for the secondary carrier based at least in part on the second maximum transmit power.

28. An apparatus, comprising:
means for reserving a portion of transmit power to a first carrier in a plurality of carriers, wherein the first carrier is an anchor carrier;
means for distributing remaining transmit power, after pre-allocation of the portion, between at least the first carrier and a second carrier of the plurality of carriers;
means for sequentially allocating data from one or more data flows to at least the first carrier and the second carrier, wherein allocation starts with the second carrier.

29. The apparatus of claim 28, further comprising means for allocating data from a non-scheduled data flow to the first carrier.

30. The apparatus of claim 29, wherein the means for allocating data from the non-scheduled data flow comprises means for filling a protocol data unit associated with the first carrier with data from the non-scheduled data flow in accordance with at least one of a size of the protocol data unit, a non-scheduled grant, an amount of data in a queue associated with the non-scheduled data flow.

31. The apparatus of claim 28, wherein the means for sequentially allocating data from one or more data flows comprises means for serving the one or more data flows in accordance with priorities associated with the one or more data flows, wherein the one or more data flows are served from a highest priority to a lowest priority.

32. The apparatus of claim 28, further comprising:
means for identifying a first set of supported packet formats associated with the first carrier; and
means for identifying a second set of supported packet formats associated with the second carrier, wherein the first set of supported packet formats and the second set of supported packet formats are identified based upon an amount of power distributed to respective carriers.

33. The apparatus of claim 32, wherein means for allocating data from one or more data flows to the first carrier comprises means for filling a protocol data unit in accordance with at least one of the first set of supported packet formats, a serving grant associated with the first carrier, or the amount of power distributed to the first carrier.

34. The apparatus of claim 32, wherein means for allocating data from one or more data flows to the second carrier comprises filling a protocol data unit in accordance with at least one of the second set of supported packet formats, a serving grant associated with the second carrier, or the amount of power distributed to the second carrier.

35. The apparatus of claim 28, wherein the means for distributing remaining transmit power comprises:
means for identifying a first maximum transmit power for the first carrier, wherein the first maximum transmit power includes a first amount of power distributed from remaining transmit power and the portion of transmit power pre-allocated to the first carrier; and
means for identifying a second maximum transmit power for the second carrier, wherein the second maximum transmit power include a second amount of power distributed from remaining transmit power.

36. The apparatus of claim 35, further comprising:
means for determining a first normalized remaining power margin for the first carrier based at least in part on the first maximum transmit power; and
means for determining a second normalized remaining power margin for the second carrier based at least in part on the second maximum transmit power.

37. A computer program product, comprising:
a non-transitory computer-readable medium, comprising:
code for causing at least one computer to reserve a portion of transmit power to an anchor carrier in a dual-carrier uplink configuration, wherein the portion of transmit power is based upon data requirements of at least one non-scheduled data flow;
code for causing the at least one computer to split remaining transmit power, after power reservation to the anchor carrier, between the anchor carrier and a secondary carrier; and
code for causing the at least one computer to fill a first protocol data unit and a second protocol data unit respectively associated with the anchor carrier and the secondary carrier, wherein the first protocol data unit and the second protocol data unit are sequentially filled starting with the second protocol data unit.

38. The computer program product of claim 37, wherein the computer-readable medium further comprises code for causing the at least one computer to fill the first protocol data unit and the second protocol data unit with data from a plurality of data flows in accordance with a set of priorities respectively associated with the plurality of data flows.

39. The computer program product of claim 37, wherein the computer-readable medium comprises code for causing the at least one computer to allocate data from the at least one non-scheduled data flow to the first protocol data unit associated with the anchor carrier.

40. The computer program product of claim 37, wherein the computer-readable medium further comprises:
 code for causing the at least one computer to determine a first set of supported packet formats associated with the anchor carrier; and
 code for causing the at least one computer to determine a second set of supported packet formats associated with the secondary, wherein the first set of supported packet formats and the second set of supported packet formats are identified based upon an amount of power distributed to respective carriers.

41. The computer program product of claim 37, wherein the computer-readable medium further comprises:
 code for causing the at least one computer to identify a first maximum transmit power for the anchor carrier, wherein the first maximum transmit power includes a first amount of power distributed from remaining transmit power and the portion reserved on the anchor carrier; and
 code for causing the at least one computer to identify at least a second maximum transmit power for the secondary carrier, wherein the second maximum transmit power includes a second amount of power distributed from remaining transmit power.

42. The computer program product of claim 41, wherein the computer-readable medium further comprises:
 code for causing the at least one computer to determine a first normalized remaining power margin for the anchor carrier based at least in part on the first maximum transmit power; and
 code for causing the at least one computer to determine a second normalized remaining power margin for the secondary carrier based at least in part on the second maximum transmit power.

43. The computer program product of claim 42, wherein the computer-readable medium further comprises code for causing the at least one computer to employ the first normalized remaining power margin and the second normalized remaining power margin in at least one of enhanced dedicated channel (E-DCH) transport format combination (E-TFC) restriction or Happy Bit generation.

44. An apparatus, comprising:
 a pre-allocation module that reserves a portion of transmit power for a non-scheduled data flow on an anchor carrier of a multi-carrier system;
 a power split module that distributes remaining transmit power, after reservation of the portion by the pre-allocation module, among the anchor carrier and a secondary carrier; and
 a data allocation module that distributes data from one or more data flows to the anchor carrier and the secondary carrier, wherein the data allocation module sequentially distributes data to the anchor carrier and the secondary carrier starting with the secondary carrier.

45. The apparatus of claim 44, further comprising a format evaluation module that updates a state of a packet format for each data flow of the one or more data flows, wherein the state is at least one of supported or blocked.

46. The apparatus of claim 45, wherein the format evaluation module updates the state based at least in part on a normalized remaining power margin.

47. The apparatus of claim 44, wherein the data allocation module allocates data from the non-scheduled data flow to the anchor carrier.

* * * * *